(12) United States Patent
Yun et al.

(10) Patent No.: US 12,495,207 B2
(45) Date of Patent: Dec. 9, 2025

(54) ELECTRONIC DEVICE AND METHOD INCLUDING ANTENNA FOR ADJUSTING FOCUS OF CAMERA

(71) Applicant: Samsung Electronics Co., Ltd., Suwon-si (KR)

(72) Inventors: Sumin Yun, Suwon-si (KR); Dongil Seo, Suwon-si (KR); Jeongwon Lee, Suwon-si (KR); Hosaeng Kim, Suwon-si (KR); Seongjin Park, Suwon-si (KR); Jaehoon Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/474,674

(22) Filed: Sep. 26, 2023

(65) Prior Publication Data

US 2024/0114240 A1 Apr. 4, 2024

Related U.S. Application Data

(63) Continuation of application No. PCT/KR2023/014579, filed on Sep. 22, 2023.

(30) Foreign Application Priority Data

Sep. 23, 2022 (KR) .................. 10-2022-0121217
Nov. 25, 2022 (KR) .................. 10-2022-0160956

(51) Int. Cl.
*H04N 23/67* (2023.01)
*G03B 13/36* (2021.01)
(Continued)

(52) U.S. Cl.
CPC ............. *H04N 23/67* (2023.01); *G03B 13/36* (2013.01); *H04N 23/69* (2023.01); *H01Q 1/247* (2013.01)

(58) Field of Classification Search
CPC ........ H04N 23/67; H04N 23/69; G03B 13/36; H01Q 1/247; H01Q 1/24
See application file for complete search history.

(56) References Cited

U.S. PATENT DOCUMENTS 10,353,066 B2   7/2019   Schwager et al.
11,204,694 B2   12/2021  Giusti et al.
(Continued)

FOREIGN PATENT DOCUMENTS

JP   2004-205402 A   7/2004
JP   2022-511815 A   2/2022
(Continued)

OTHER PUBLICATIONS

International Search Report with Written Opinion and English translation dated Jan. 16, 2024; International Appln. No. PCT/KR2023/014579.

*Primary Examiner* — Shahbaz Nazrul
(74) *Attorney, Agent, or Firm* — Jefferson IP Law, LLP

(57) ABSTRACT

An electronic device includes a first antenna element, an array antenna including a plurality of second antenna elements spaced apart from each other, a camera, and a processor. The processor is configured to identify a field of view (FoV) of the camera, identify a distance from an external object within the FoV by using the first antenna element and a first set of at least one antenna element of the plurality of second antenna elements, based on the FoV as a first value, identify a distance from the external object by using the first antenna element and a second set of at least one antenna element of the plurality of second antenna elements, based on the FoV as a second value, adjust a focus distance of the camera based on the identified distance, and obtain an image for the external object through the camera having the adjusted focus distance.

20 Claims, 15 Drawing Sheets

(51) Int. Cl.
  *H04N 23/69*    (2023.01)
  *H01Q 1/24*    (2006.01)

(56) References Cited

U.S. PATENT DOCUMENTS

| | | |
|---|---|---|
| 11,290,166 B2 | 3/2022 | Kim et al. |
| 11,310,478 B2 | 4/2022 | Fattal |
| 11,516,377 B2 | 11/2022 | Hu |
| 2021/0329221 A1 | 10/2021 | Arbanian et al. |
| 2021/0333381 A1* | 10/2021 | Astrom ................ G01S 15/86 |
| 2022/0174221 A1 | 6/2022 | Frischman et al. |
| 2022/0247073 A1 | 8/2022 | Choi et al. |
| 2023/0223695 A1 | 7/2023 | Yun et al. |

FOREIGN PATENT DOCUMENTS

| | | |
|---|---|---|
| KR | 10-2018-0061993 A | 6/2018 |
| KR | 10-2020-0042020 A | 4/2020 |
| KR | 10-2021-0048959 A | 5/2021 |
| KR | 10-2022-0023237 A | 3/2022 |
| KR | 10-2604991 B1 | 11/2023 |
| WO | 2023/136632 A1 | 7/2023 |

* cited by examiner

ELECTRONIC DEVICE AND METHOD INCLUDING ANTENNA FOR ADJUSTING FOCUS OF CAMERA

CROSS-REFERENCE TO RELATED APPLICATION(S)

This application is a continuation application, claiming priority under § 365(c), of an International application No. PCT/KR2023/014579, filed on Sep. 22, 2023, which is based on and claims the benefit of a Korean patent application number 10-2022-0121217, filed on Sep. 23, 2022, in the Korean Intellectual Property Office, and of a Korean patent application number 10-2022-0160956, filed on Nov. 25, 2022, in the Korean Intellectual Property Office, the disclosure of each of which is incorporated by reference herein in its entirety.

TECHNICAL FIELD

The disclosure relates to an electronic device and a method including an antenna for adjusting focus of a camera.

BACKGROUND ART

An electronic device may include a radar to recognize a distance from an object such as an external entity. In addition, the electronic device may use a camera to obtain an image including the external entity. In order to obtain a clear image, the electronic device may adjust the focus of the camera.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device and a method including an antenna for adjusting focus of a camera.

Additional aspects will be set forth in part in the description which follows and, in part, will be apparent from the description, or may be learned by practice of the presented embodiments.

In accordance with an aspect of the disclosure, an electronic device is provided. The electronic device may include a first antenna element. The electronic device may comprise an array antenna including a plurality of second antenna elements spaced apart from each other. The electronic device may comprise a camera. The electronic device may comprise a processor coupled to the first antenna element, the array antenna, and the camera. The processor may be configured to identify a field of view (FoV) of the camera. The processor may be configured to identify a distance from an external object within the FoV by using the first antenna element and a first set of at least one antenna element of the plurality of the second antenna elements, based on the FoV as a first value. The processor may be configured to identify a distance from the external object within the FoV by using the first antenna element and a second set of at least one antenna element of the plurality of the second antenna elements, based on the FoV as a second value different from the first value. The processor may be configured to adjust a focus distance of the camera based on the identified distance. The processor may be configured to obtain an image for the external object through the camera having the adjusted focus distance.

In accordance with another aspect of the disclosure a method performed by an electronic device is provided. The method may include identifying a FoV of a camera of the electronic device. The method may comprise identifying a distance from an external object within the FoV by using a first antenna element and a first set of at least one antenna element of a plurality of second antenna elements, based on the FoV as a first value. The method may comprise identifying a distance from the external object within the FoV by using the first antenna element and a second set of at least one antenna element of the plurality of the second antenna elements, based on the FoV as a second value different from the first value. The method may comprise adjusting a focus distance of the camera based on the identified distance. The method may comprise obtaining an image for the external object through the camera having the adjusted focus distance.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
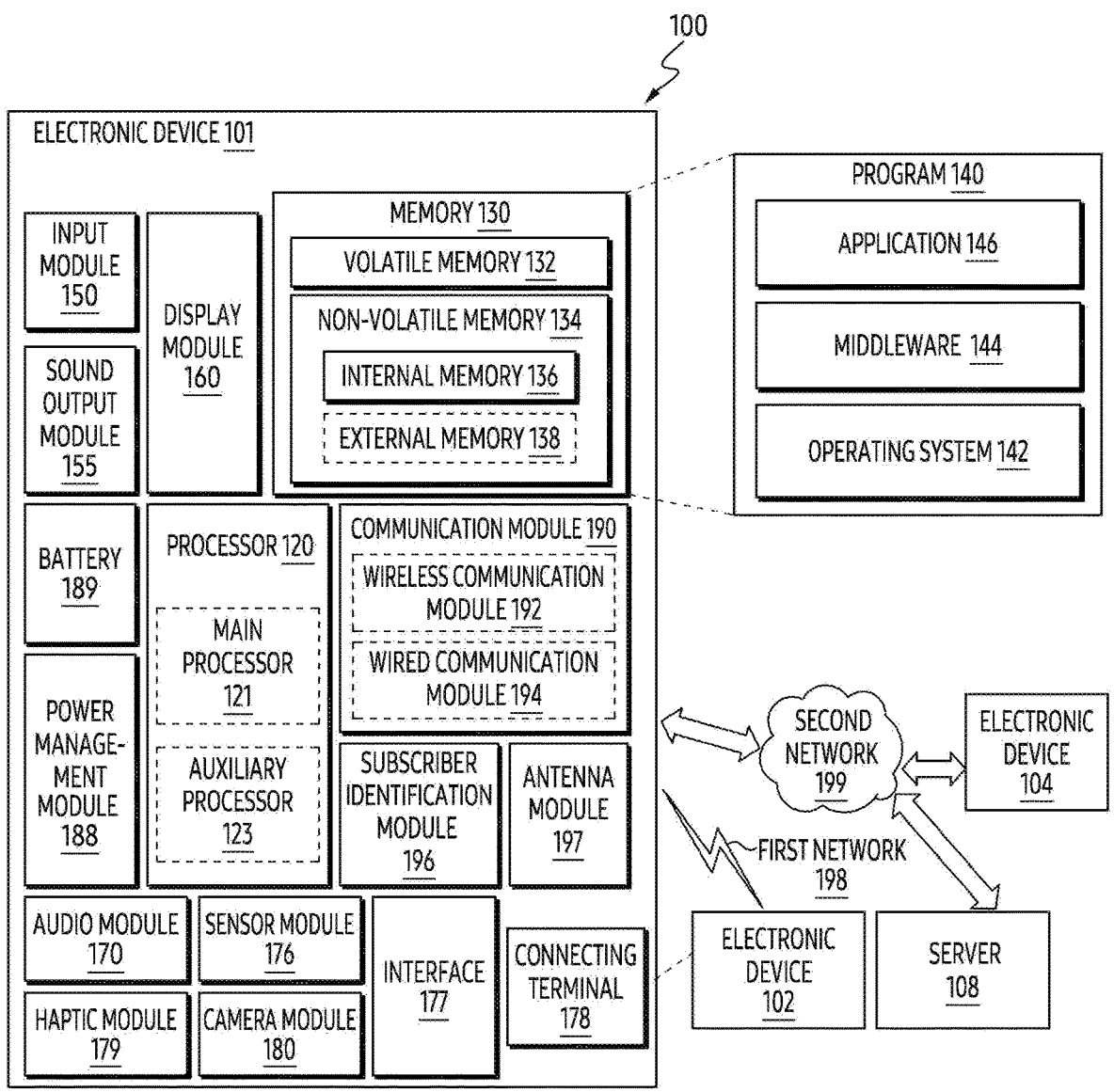
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein, including technical or scientific terms, may have the same meaning as those generally understood by those skilled in the art described in the disclosure. Among the terms used in the disclosure, general dictionary-defined terms may be interpreted in the same or similar sense as the context of the related technology and are not interpreted in an ideal or excessively formal sense unless clearly defined in the disclosure. In some cases, even the terms defined in the disclosure cannot be interpreted to exclude embodiments of the disclosure.

In various embodiments of the disclosure described below, a hardware access method is described as an example. However, since various embodiments of the disclosure include technology that uses both hardware and software, various embodiments of the disclosure do not exclude software-based access methods.

Terms (e.g., processor, radar, antenna, antenna element, array antenna, camera, module, and the like) used in the following description to refer to components of a device, terms (e.g., step, operation, procedure) for computational states, terms (e.g., signal, information, and the like) for signals, terms (e.g., parameter, value, magnification, and the like) for data, and terms (e.g., beam, beamwidth, coverage, and the like) for the concept of wireless communication are exemplified for convenience of description. Accordingly, the disclosure is not limited to terms to be described later, and other terms having the same technical meaning may be used.

In addition, in the disclosure, the expression 'exceed' or 'less than' may be used to determine whether a specific condition is satisfied or fulfilled, but this is a description for expressing an example and does not exclude 'above' or 'below'. Conditions described as 'above' may be replaced with 'exceed', conditions described as 'below' may be replaced with 'less than', and conditions described as 'above and below' may be replaced with 'exceed and less than'. In addition, hereinafter, 'A' to 'B' mean at least one of the elements from A (including A) to B (including B).

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a fifth generation 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 ms or less for each of downlink (DL) and uplink (UL), or a round trip of 1 milliseconds (ms) or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
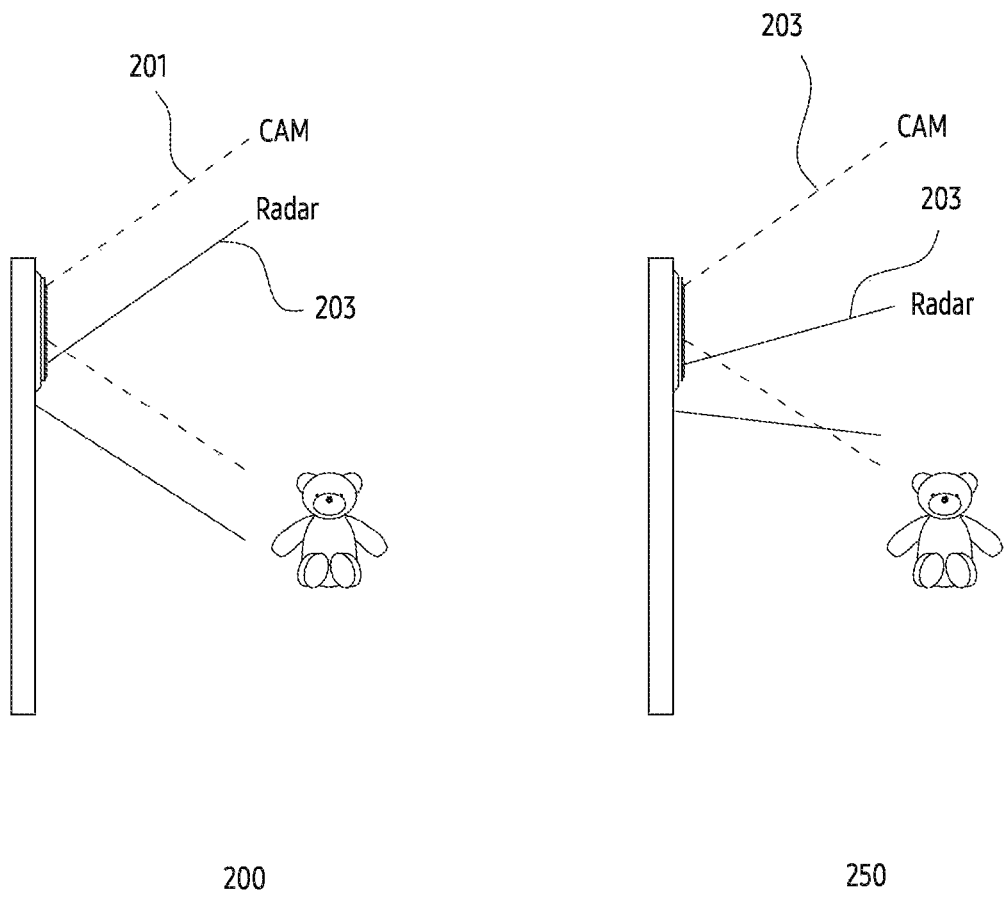
FIG. 2 illustrates an example for explaining whether an external entity are recognizable according to a field of view (FoV) of a camera of an electronic device and an FoV of a radar according to an embodiment of the disclosure.

FIG. 2 illustrates an example for explaining whether an external entity are recognizable according to a field of view (FoV) of a camera of an electronic device and an FoV of a radar according to an embodiment of the disclosure. Herein, the FoV (unit: degree [°]) may mean an angle with respect to a range recognizable by the camera or the radar. The FoV of the camera may be determined as a unique value according to the lens of the camera.

An electronic device may require a process of adjusting focus of the camera to identify an object (or external entity) and obtain an image, through the camera. The electronic device may identify a distance to the object and transmit the corresponding information to the lens to adjust the focus by using a camera capable of self-adjusting a focus (or focal length) within a lens of the camera (e.g., a camera including a phase detection sensor) or through a sensor (e.g., laser imaging detection and ranging (Lidar), time of flight (ToF) sensors) that can measure the distance to the object. Alternatively, the electronic device may identify the distance through a separate ranging sensor for detecting a distance and adjust the focus. As described above, the electronic device may adjust the focus through a camera capable of self-adjusting a focus, or may identify and adjust the distance to the object through a separate sensor, but in this case, since the size of the camera itself increases or additional components are required, a separate mounting space in the electronic device may be required. In addition, the size of the electronic device may be expanded, and the production cost of the electronic device may be increased. Therefore, a method for calculating a distance to an object (or external entity) and adjusting a focus of a camera without an additional configuration of the electronic device is required. In this case, in order to calculate the distance from the electronic device to the object, the electronic device may use a radar.

The radar may refer to a device that recognizes a distance to an object by detecting a signal reflected from the object or external entity. For example, the radar may calculate the distance to the object based on the time required for the signal transmitted through the antenna to be reflected and received by the object and the speed of the signal. Hereinafter, in the description of the disclosure, a radar may be understood as a structure that refers to or includes an antenna.

The radar may have different frequencies, transmission power, and antenna gains depending on the application to be used. In particular, as the bandwidth of the signal increases, the resolution of the antenna becomes more sophisticated, and thus the range of use of the radar may be widened. In order to implement such a radar function, the electronic device may include an ultra-wideband (UWB) antenna. The electronic device may support a service for finding a lost electronic device, a service for transmitting and receiving data with an external device by using direction and distance detection technology through the UWB antenna. In addition to the UWB, the electronic device may include an antenna for supporting radar technology using a frequency of 60 gigahertz (GHz).

The electronic device needs to identify the distance to the object in order to adjust the focus of the camera without additional components. The electronic device may use a radar to identify the distance to the object. However, if an area recognized by the camera and an area recognized by the radar are different, it may be difficult for the electronic device to precisely adjust the focus of the camera. Details related to this are illustrated through the first situation 200 and the second situation 250 of FIG. 2.

Referring to FIG. 2, the first situation 200 in which the FoV of the camera of the electronic device matches the FoV of the radar, and the second situation 250 in which the FoV of the camera of the electronic device and the FoV of the radar do not match each other are shown. Referring to the first situation 200, the FoV 201 of the camera and the FoV 203 of the radar may be the same. When the FoV 201 of the camera is the same as the FoV 203 of the radar, the camera may recognize an external entity by recognizing an area that needs to be recognized by the radar and delivering accurate information to the camera. In other words, the electronic device may identify a desired area through the camera, and the electronic device may obtain an image including an object (e.g., external entity) within the desired area. Alternatively, referring to the second situation 250, the FoV 201 of the camera and the FoV 205 of the radar may not be the same. When the FoV 201 of the camera and the FoV 205 of the radar are not the same, the camera may not recognize or misrecognize an area that needs recognition, in the radar. Therefore, the radar may not recognize the external entity by transmitting the wrong information to the camera. In other words, the electronic device may not be able to identify the desired area through the camera, and the electronic device may obtain an unclear image that does not include an object (e.g., an external entity) within a desired area or is out of focus.

Therefore, in order to obtain the desired image, the electronic device needs to be designed to match the FoV of the camera with the FoV of the radar. The FoV of the camera may be determined according to the lens of the camera. The FoV of the radar may be determined according to the width of the beam formed through the antenna. Herein, the width of the beam formed through the antenna may be determined based on directivity of the antenna. The directivity of the antenna may be determined according to the type of the antenna. For example, the types of antennas may include a dipole antenna, a patch antenna, a loop antenna, and the like. By changing the type of antenna, the width of the beam formed by the antenna may be changed in the range of about 10 to 20°. However, since the FoV of the camera may be changed in both horizontal components and vertical components (and diagonal components), it may be difficult to configure the FoV of the radar to correspond to the FoV of the camera only by changing the type of antenna. Therefore, a method of changing the FoV of the radar to correspond to the FoV of the camera without changing the type of antenna is required.

Figure 3:
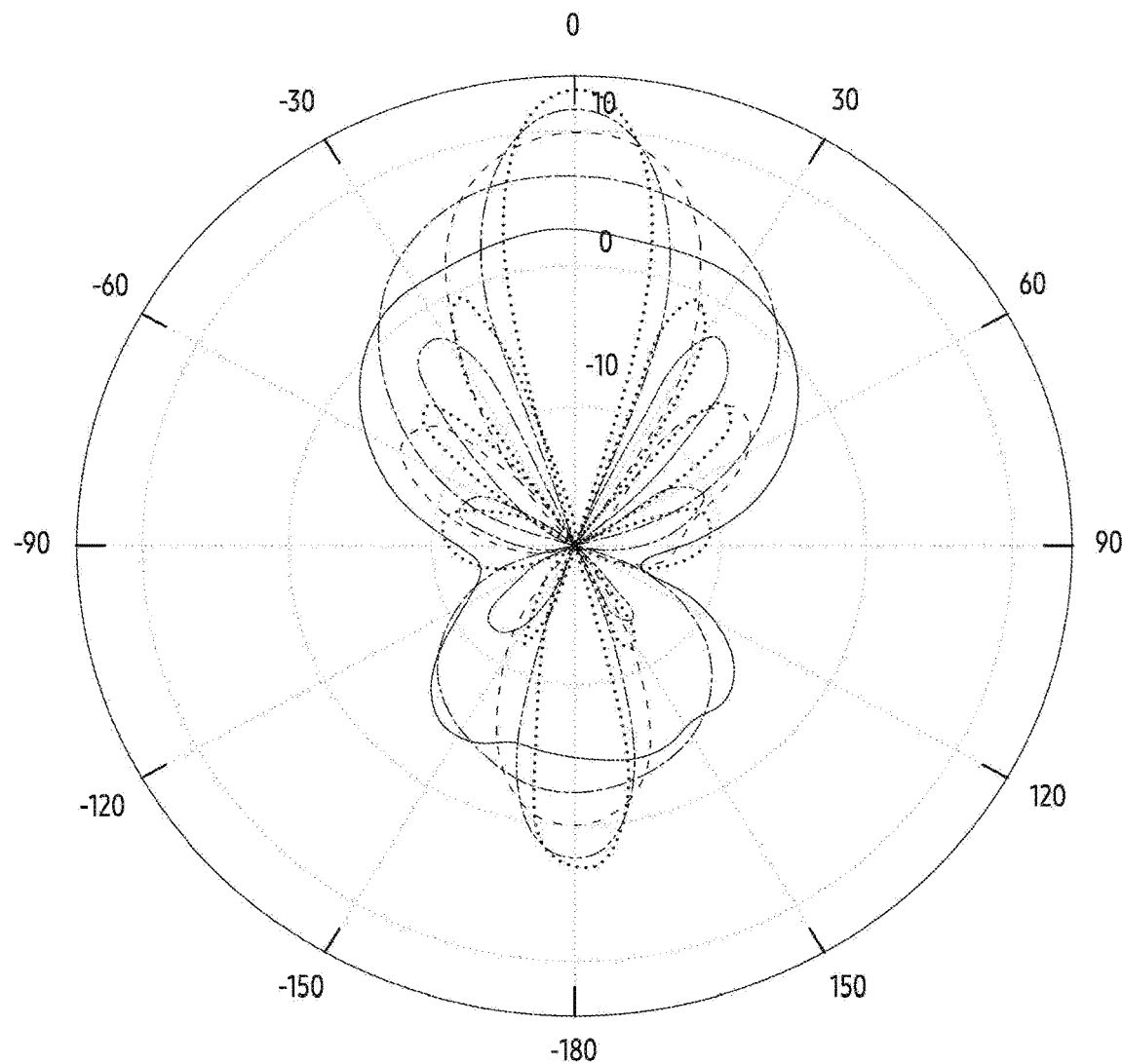
FIG. 3 illustrates an example of antenna gain and beamwidth according to the number of antenna elements according to an embodiment of the disclosure.

FIG. 3 illustrates an example of antenna gain and beamwidth according to the number of antenna elements according to an embodiment of the disclosure. Herein, the antenna element may refer to each component included in the antenna. In other words, the antenna may refer to a device including at least one antenna element. For example, an antenna including two radiators to consider dual polarization may be considered to include two antenna elements. In addition, the beam may refer to a radiation state of a signal transmitted by an antenna including at least one antenna element. In particular, the beam may include a main lobe having the highest signal intensity and a sidelobe reflectively generated according to signal synthesis. The gain of the antenna may refer to a gain in the main lobe of the beam, and the width of the beam may refer to an angle between both points which is reduced by 3 dB of the maximum gain in the main lobe of the beam and the center.

The graph of FIG. 3 illustrates a first line 301 showing the gain and beamwidth of an antenna including one antenna element, a second line 303 showing the gain and beamwidth of an antenna including two antenna elements, a third line 305 showing the gain and beamwidth of an antenna including four antenna elements, a fourth line 307 showing the gain and beamwidth of an antenna including six antenna elements, a fifth line 309 showing the gain and beamwidth of an antenna including eight antenna elements.

Referring to the first line 301 to the fifth line 309, the maximum gain of each of the antennas is formed in 0° direction in all line. Hereinafter, for relative comparison, the first line 301 illustrating the gain and beamwidth of an antenna including one antenna element is used as a reference. Comparing the first line 301 and the second line 303, an antenna including two antenna elements has a gain of about 3 dBi higher in the 0° direction than an antenna including one antenna element. However, the antenna including two antenna elements may form a narrower beamwidth by a ratio of 0.42 compared to the antenna including one antenna element. In addition, when comparing the first line 301 and the third line 305, the antenna including four antenna elements has a gain of about 6 dBi higher in the 0° direction than the antenna including one antenna element. However, the antenna including four antenna elements may form a narrower beamwidth by a ratio of 0.205 compared to the antenna including one antenna element. Considering the fourth line 307 and the fifth line 309, when the number of antenna elements increases, the gain of the antenna increases, but the width of the beam formed by the antenna may decrease. In addition, since the number of antenna elements, which are components of the antenna, increases, the size of the antenna may also increase.

According to the above, since the maximum gain in a certain direction increases and the width of the beam decreases as the number of antenna elements increases, an array antenna, which is an antenna in which a plurality of antenna elements are arrayed, may have high directivity. Specifically, array antenna technology is a technology that improves antenna gain by arranging similar types of antenna elements in a row or horizontal plane, and may be used in areas requiring high gain antenna design such as 5G mmWave, military Radar, and base station. For example, an electronic device may be equipped with a mmWave module for 5G mmWave communication. Antennas included in the module of the electronic device may be designed as arrays such as 1×5 to implement a high gain. The array antenna may implement high directivity in a specific direction, by using a characteristic that signals radiated from each antenna element are amplified by generating constructive interference in a specific direction and lowered by destructive interference in other directions. Since the corresponding reinforcement/decomposition effect increases as the number of antenna elements configuring the array antenna increases, the directivity of the array antenna may increase. Hereinafter, the device and method of the disclosure may provide a method for configuring a FoV of a radar (e.g., an antenna) with a value corresponding to the FoV of the camera, and thus effectively adjusting the focal length of the camera, through an electronic device including a plurality of antenna elements.

Figure 4:
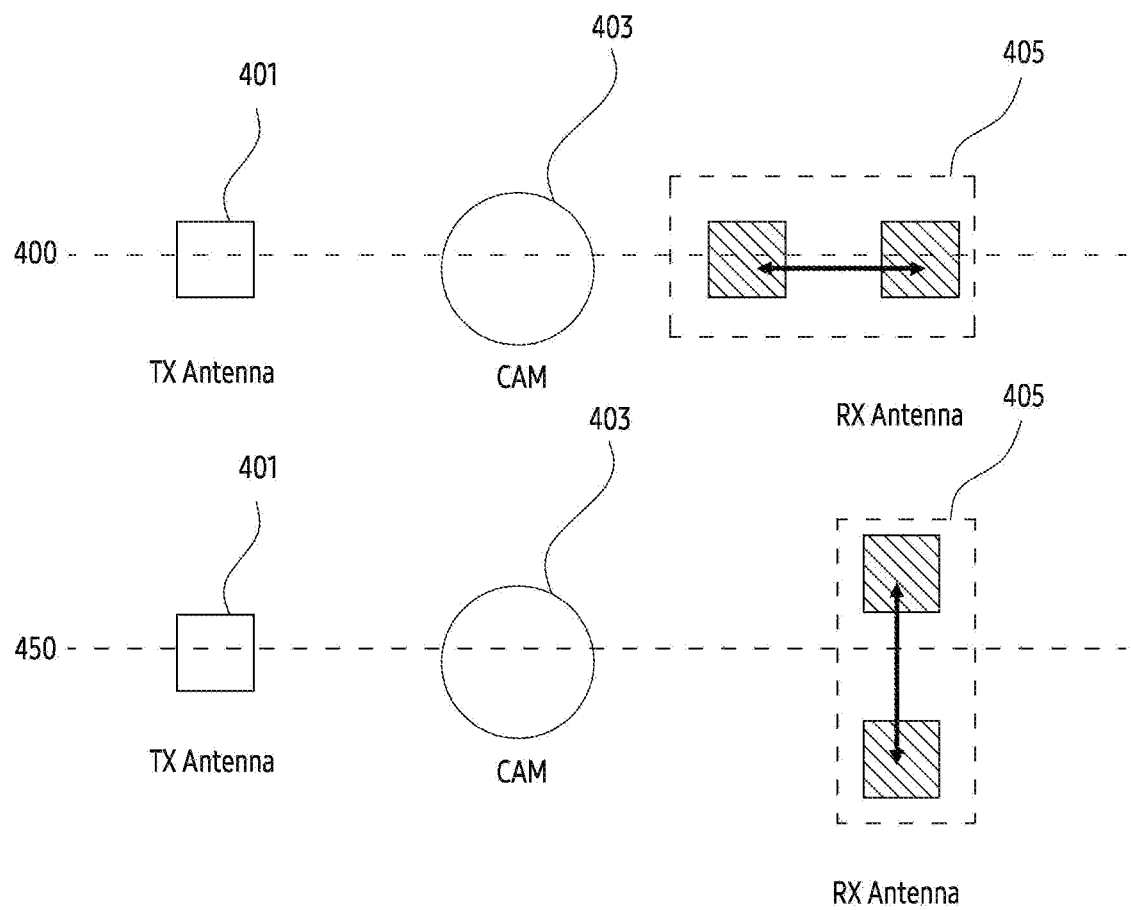
FIG. 4 illustrates an example of an electronic device including a plurality of antennas for adjusting focus of a camera according to an embodiment of the disclosure.

FIG. 4 illustrates an example of an electronic device including a plurality of antennas for adjusting focus of a camera according to an embodiment of the disclosure. A plurality of antennas included in the electronic devices 400 and 450 of FIG. 4 may include a transmission antenna and a reception antenna. The electronic devices 400 and 450 exemplify the electronic device 101.

The transmission antenna may include at least one antenna element, and the reception antenna may include a plurality of antenna elements. Hereinafter, for convenience of description, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 4, an example of the structure of the electronic device 400 for adjusting focus of the FoV camera 403 composed of a FoV whose FoV value of vertical component (or length) is greater than the FoV value of horizontal component (or width) and an example of the structure of the electronic device 450 to adjust focus of the FoV camera 403 composed of a FoV whose FoV value of vertical component (or length) is less than the FoV value of horizontal component (or width) are illustrated. FIG. 4 illustrates a reception antenna 405 including two antenna elements 2×1 and 1×2, but the disclosure is not limited thereto. For example, the reception antenna 405 may be an array antenna including three antenna elements (e.g., 3×1 and 1×3). In addition, the reception antenna 405 may be an array antenna including four antenna elements (e.g., 1×4, 2×2, and 4×1). In addition, FIG. 4 illustrates a transmission antenna 401 including one antenna element, but it may be configured with an antenna including a plurality of antenna elements. The description of the transmission antenna 401 configured an array antenna including a plurality of antenna elements will be described in detail in FIG. 8 below.

The electronic device 400 may include the transmission antenna 401, the camera 403, and the reception antenna 405. The transmission antenna 401, the camera 403, and the reception antenna 405 may be disposed so that at least a part overlaps with a virtual line passing through a center of the camera 403. For example, each of the transmission antenna 401 and the reception antenna 405 may be disposed so that a center matches the virtual line passing through a center of the camera 403. Alternatively, the transmission antenna 401 may be disposed so that the center of the camera 403 matches, and the reception antenna 405 may be disposed in an area where the virtual line passing through a center of the camera 403 passes. In addition, the transmission antenna 401 may be disposed in the area where the virtual line virtual line passing through a center of the camera 403 passes, and the reception antenna 405 may be disposed so that the center of the camera 403 matches.

The transmission antenna 401 of the electronic devices 400 and 450 may be used to transmit a signal. For example, the transmission antenna 401 may transmit a signal to identify (or calculate) a distance to an object. In addition, the transmission antenna 401 may transmit a signal for transmitting and receiving data with an external electronic device. The signal may include a reference signal. For example, the reference signal may include a sounding reference signal (SRS), a channel state information-reference signal (CSI-RS), a demodulation-reference signal (DM-RS), a channel state information-reference signal (CSI-RS) and a synchronization signal/physical broadcast channel (SS/PBCH). The transmission antenna 401 may be configured with various types of antennas. For example, the transmission antenna 401 may be one of a dipole antenna, a monopole antenna, a patch antenna, a loop antenna, and an inverted F antenna (IFA).

The reception antenna 405 of the electronic devices 400 and 450 may be used to receive various signals including a signal transmitted from the transmission antenna 401. For example, the reception antenna 405 may receive a signal to identify (or calculate) a distance to an object. In addition, the reception antenna 405 may receive a signal for transmitting and receiving data with an external electronic device. The signal may include a reference signal. For example, the reference signal may include a sounding reference signal (SRS), a channel state information-reference signal (CSI-RS), a demodulation-reference signal (DM-RS), a channel state information-reference signal (CSI-RS) and a synchronization signal/physical broadcast channel (SS/PBCH). The reception antenna 405 of the electronic devices 400 and 450 may include a plurality of antenna elements, and the plurality of antenna elements may be disposed to be spaced apart from each other by a predetermined distance. Here, the predetermined distance may be determined based on a wavelength of signals transmitted and received by the plurality of antenna elements. For example, when the wavelength of a signal received through a plurality of antenna elements is $\lambda$, the plurality of antenna elements may be spaced apart by 0.4 to 0.7$\lambda$. Here, the spaced distance may mean a distance between centers of the antenna elements. Arranging the plurality of antenna elements spaced apart from each other may reduce interference between antenna elements and effect of sidelobe and improve signal performance. The reception antenna 405 may be configured with various types of antennas. For example, the reception antenna 405 may be one of a dipole antenna, a monopole antenna, a patch antenna, a loop antenna, and an inverted F antenna (IFA).

The camera 403 of the electronic devices 400 and 450 may include at least one lens and a sensor. In this case, a field of view (FoV) of the camera 403 may be determined based on the focal length and the size of the sensor or a film on which the image is reflected. According to FoV, the lens of the camera 403 may be defined as a super wide angle, a wide angle, a telephoto. In other words, when the type of the camera 403 is changed, the FoV of the camera 403 may be changed. The FoV of the camera 403 may be defined as a set of a plurality of components. For example, the FoV of camera 403 may include a FoV of horizontal component (or width), a FoV of vertical component (or length), or a FoV of both horizontal components and vertical components and a FoV of diagonal components. An example of the camera 403 configured with a FoV including the FoV of a horizontal component and a vertical component is shown in Table 1 below.

TABLE 1

|  | Case 1 | Case 2 | Case 3 | Case 4 | Case 5 |
|---|---|---|---|---|---|
| Camera FoV | 100°(H) 100°(V) | 70°(H) 100°(V) | 100°(H) 70°(V) | 70°(H) 70°(V) | 70°(H) 40°(V) |
| antenna configuration (width and length) | 1 × 1 (Ref) | 2 × 1 | 1 × 2 | 2 × 2 | 2 × 4 |

Table 1 illustrates the FoV of a camera including the FoV(H) of a horizontal component and the FoV(V) of a vertical component and a configuration of an antenna (or an array antenna) according to the FoV. Hereinafter, the beamwidth of the antenna may be related to the directivity of the antenna. In addition, the beamwidth of the antenna may be understood substantially the same as the FoV of the radar.

Referring to Case 1, which is a reference, when the FoV of the horizontal component is 100° and the FoV of the vertical component is 100°, the antenna may include one antenna element 1×1.

Referring to Case 2, when the FoV of the horizontal component is 70° and the FoV of the vertical component is 100°, the antenna may include two antenna elements 2×1. The electronic device of Case 2 may be understood as an example of the electronic device 400 of FIG. 4. Since more antenna elements are disposed relatively horizontally, the antenna of Case 2 may form a beam having a beamwidth of the antenna corresponding to the FoV of the horizontal component narrower than the vertical component. A relatively accurate beam may be formed when a beam is formed through more antenna elements than when a beam is formed through a small number of antenna elements. In this way, a narrow beam in the width direction (i.e., a narrow beam in the horizontal direction) may be formed by arranging more antenna elements in the width direction. Therefore, the antenna of Case 2 may form a beam having a beamwidth corresponding to (or matching) the FoV of a camera having a relatively narrow FoV of a horizontal component.

Referring to Case 3, when the FoV of the horizontal component is 100° and the FoV of the vertical component is 70°, the antenna may include two antenna elements 1×2. The electronic device of Case 3 may be understood as an example of the electronic device 450 of FIG. 4. The antenna of Case 3 may form a beam having a beamwidth of the antenna corresponding to the FoV of the vertical component narrower than the horizontal component by arranging more antenna elements relatively vertically. Similar to what was described in Case 2, a narrow beam in the length direction (i.e., a narrow beam with a vertical direction) may be formed by arranging more antenna elements in the length direction. Therefore, the antenna of Case 3 may form a beam having a beamwidth corresponding to (or matching) the FoV of a camera having a relatively narrow FoV of a vertical component.

Referring to Case 4, when the FoV of the horizontal component is 70° and the FoV of the vertical component is 70°, the antenna may include four antenna elements 2×2. The antenna of Case 4 may form a beam having the beamwidth of the antenna corresponding to the FoV of relatively narrow horizontal component for Case 1 and the FoV of the vertical component by arranging more antenna elements in the length and width compared to Case 1. Therefore, the antenna of Case 4 may form a beam having a beamwidth corresponding to (or matching) the FoV of a camera in which the FoV of the horizontal component and the FoV of the vertical component are relatively narrow.

Referring to Case 5, when the FoV of the horizontal component is 70° and the FoV of the vertical component is 40°, the antenna may include eight antenna elements 2×4. The antenna of Case 5 may form a beam having a beamwidth of the antenna corresponding to the FoV of the camera including the FoV of the vertical component narrower than the horizontal component by arranging more antenna elements in the length compared to Case 4. Therefore, the antenna of Case 5 may form a beam having a beamwidth corresponding to (or matching) the FoV of a camera having a relatively narrow FoV of the horizontal component.

In other words, the electronic device may correspond (or match) the beamwidth of the antenna (i.e., the FoV of the radar) and the FoV of the camera by configuring the antenna based on the FoV of the camera. Accordingly, the electronic device may effectively identify a distance of an object through the antenna (or radar) corresponding the FoV of the camera, and precisely adjust the focus (or focal length) of the camera by passing the information to the processor.

Figure 5:
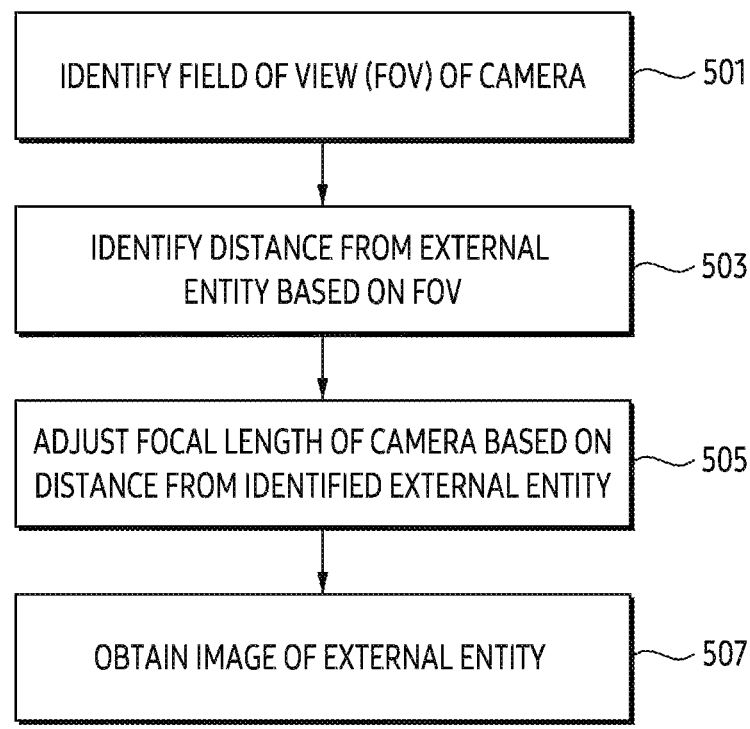
FIG. 5 is a flowchart illustrating an example of a method for adjusting focus of a camera by using a plurality of antennas according to an embodiment of the disclosure.

FIG. 5 is a flowchart illustrating an example of a method for adjusting focus of a camera by using a plurality of antennas according to an embodiment of the disclosure. Herein, the method for adjusting the focus of the camera using a plurality of antennas may be performed by an electronic device (e.g., the electronic device 101, the electronic device 400, the electronic device 450) or at least one processor (e.g., the processor 120) of the electronic device 101. In addition, although the FoV of the camera may include horizontal component and vertical component as described in FIG. 4. FIG. 5 describes the FoV of the camera for convenience of explanation, but the disclosure is not limited thereto and the case of distinguishing the FoV of the horizontal component and the FoV of the vertical component may be included.

In operation 501, the electronic device 101 may identify a field of view (FoV) of the camera. The FoV of the camera may be determined based on the focal length and the size of the sensor or a film on which the image is reflected. Herein, the FoV of the camera may be a predetermined value according to the focal length and the size of the film or sensor. Although not illustrated in FIG. 5, the electronic device 101 may identify that an application related to the camera is executed before operation 501.

In operation 503, the electronic device 101 may identify a distance from an external entity based on the identified FoV. The electronic device 101 may identify at least one antenna element among a plurality of antenna elements of the reception antenna (e.g., an array antenna) based on a value of the identified FoV.

The electronic device 101 may identify the distance from the external entity by transmitting and receiving signals using a pair of at least one identified antenna element of the reception antenna and a transmission antenna. For example, in the case of the first value of FoV, the electronic device 101 may identify at least one antenna element in a first set among a plurality of antenna elements of the reception antenna. The electronic device 101 may identify the distance from the external entity by transmitting and receiving signals using a pair of the identified first set of at least one antenna element and the transmission antenna. In addition, in the case of the second value of FoV, the electronic device 101 may identify at least one antenna element in a second set among the plurality of antenna elements of the reception antenna. The electronic device 101 may identify the distance from the external entity by transmitting and receiving signals using a pair of the identified second set of at least one antenna element and transmission antennas. In this case, at least one antenna element of the first set and at least one antenna element of the second set may be different from each other, or at least a part thereof may overlap. It is assumed that the reception antenna includes four antenna elements Ant1, Ant2, Ant3, and Ant4. For example, at least one antenna element in the first set may be two antenna elements (Ant1, Ant2), and at least one antenna element in the second set may be three antenna elements (Ant1, Ant3, Ant4). In this case, Ant1 may overlap the first set and the second set. For another example, at least one antenna element in the first set may be one antenna element Ant1, and at least one antenna element in the second set may be two antenna elements Ant2 and Ant3. In this case, the antenna configuration of the first set and the antenna configuration of the second set may not overlap each other. For another example, at least one antenna element in the first set may be two antenna elements Ant1, Ant2, and at least one antenna element in the second set may be three antenna elements Ant1, Ant2, and Ant3. In this case, the antenna configuration of the first set may be entirely overlapped with the antenna configuration included in the antenna configurations of the second set.

In operation 505, the electronic device 101 may adjust the focal length of the camera of the electronic device 101 based on the distance from the identified external entity. For example, the electronic device 101 may adjust the focal length of the camera by calculating the focal length of the camera corresponding to the distance from the identified external entity and adjusting the distance between a plurality of lenses of camera.

In operation 507, the electronic device 101 may obtain an image of the external entity through the camera having an adjusted focal length.

Figure 6:
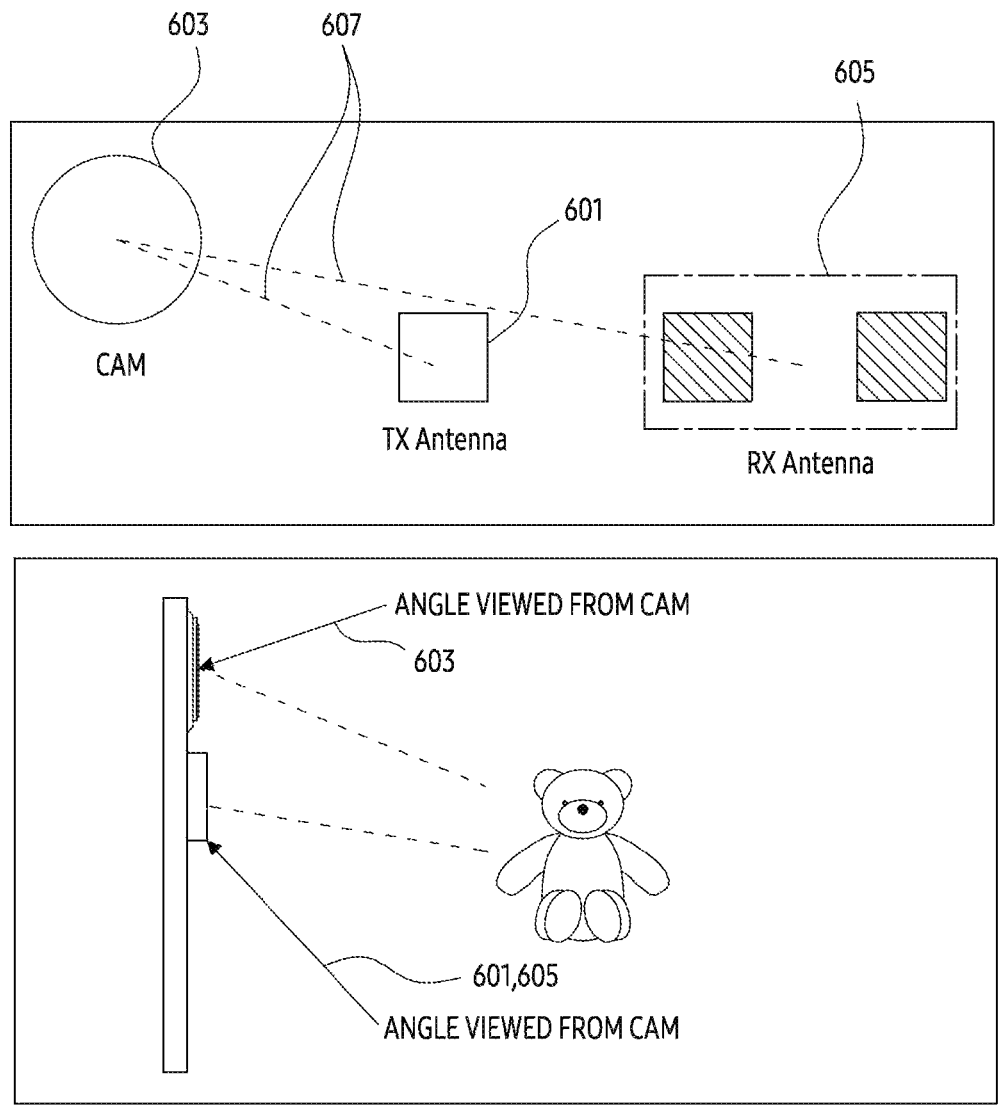
FIG. 6 illustrates another example of an electronic device including a plurality of antennas for adjusting focus of a camera according to an embodiment of the disclosure.

FIG. 6 illustrates another example of an electronic device including a plurality of antennas for adjusting focus of a camera according to an embodiment of the disclosure.

Referring to FIG. 6, a plurality of antennas included in an electronic device (e.g., the electronic device 101, the electronic device 400, and the electronic device 450) may include a transmission antenna and a reception antenna. The transmission antenna may include at least one antenna element, and the reception antenna may include a plurality of antenna elements. Hereinafter, for convenience of explanation, an example of an electronic device including a transmission antenna and a reception antenna as separate antennas is described. However, the disclosure is not limited thereto, and the embodiment of the disclosure may include a case of transmitting a signal through a part of the antenna element of a plurality of antenna elements and receiving a signal through another part of the antenna element including the part or still another part of the antenna element that does not include the part.

Referring to FIG. 6, an electronic device (e.g., the electronic device 101) may include a transmission antenna 601, a reception antenna 605, and a camera 603. Unlike FIG. 4, FIG. 6 illustrates a case in which a first axis that is a virtual line extending in the horizontal direction (or width) while passing through the center of transmission antenna 601 and reception antenna 605 (e.g., array antenna) and a second axis that is a virtual line extending in the horizontal direction passing through the center of the camera 603 do not matched each other. However, the disclosure is not limited thereto, an axis passing through the center of the transmission antenna 601 and an axis passing through the center of the reception antenna 605 may not match each other. When at least part of the transmission antenna, camera, and reception antenna of the electronic device 101 overlaps or matches with respect to the same axis, as shown in FIG. 4, the distance between the electronic device 101 and the object may be measured and calculated while minimizing calibration.

However, in the case of the electronic device 101 of FIG. 6, since an object identified by transmission antenna 601 and reception antenna 605 (e.g., radar) and an object identified by camera 603 are different from each other, calibration may be required. For example, the electronic device 101 may identify a distance from the electronic device 101 to the object (or external entity), based on information on a distance 607 from the camera 603 to the transmission antenna and a distance 607 from the camera 603 to the reception antenna. The distance 607 from the camera 603 to the reception antenna may be an average distances to the center of the reception antennas 605 or to each of the antenna elements included in the reception antenna 605. In addition, the electronic device 101 may identify the distance from the electronic device 101 to the object based on information on the angle and distance between the camera 603 and the object. The electronic device 101 may identify the distance from the electronic device 101 to the object based on information on the angle and distance between the radar (transmission antenna 601 and reception antenna 605) and the object. For example, information on the angle may be an angle or arrival of angle (AoA) between a virtual line connecting the object (or external entity) from the camera 603 or the radar and a virtual line in the horizontal direction (or width).

As described above, the electronic device 101 may adjust a distance to an object measured and calculated through a radar, based on information on the distance between camera 603 and transmission antenna 601, information on the distance between camera 603 and reception antenna 605, information on the angle and distance between the camera 603 and the object, and information on the angle and distance between the transmission antenna 601 and the reception antenna 605. Accordingly, the electronic device 101 of FIG. 6 may accurately calculate and adjust the focal length of the camera 603 as in the electronic device 400 and 450 of FIG. 4.

Figure 7:
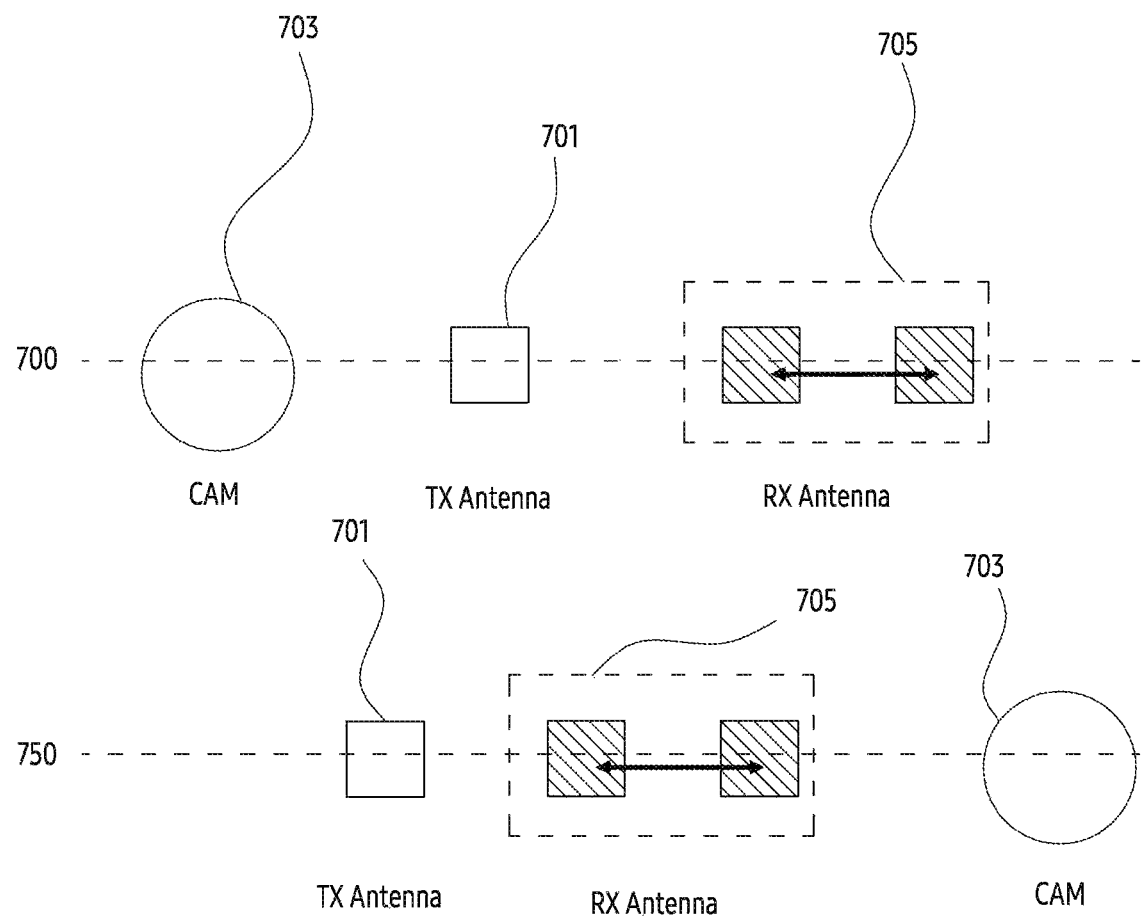
FIG. 7 illustrates an example of an arrangement between a camera and a plurality of antennas of an electronic device according to an embodiment of the disclosure.

FIG. 7 illustrates an example of an arrangement between a camera and a plurality of antennas of an electronic device according to an embodiment of the disclosure. FIG. 7 illustrates examples of arrangement between a camera and a plurality of antennas of an electronic device. A plurality of antennas of the electronic devices 700 and 750 of FIG. 7 may include a transmission antenna and a reception antenna. The electronic devices 700 and 750 exemplify the electronic device 101. The transmission antenna may include at least one antenna element, and the reception antenna may include a plurality of antenna elements. Hereinafter, for convenience of explanation, an electronic device including a transmission antenna and a reception antenna as separate antennas is described as an example. However, the disclosure is not limited thereto, and the embodiment of the disclosure may include a case of transmitting a signal through a part of the antenna element of a plurality of antenna elements and receiving a signal through another part of the antenna element including the part or still another part of the antenna element that does not include the part.

Unlike FIG. 4, FIG. 7 illustrates a case in which the transmission antenna 701, the camera 703, and the reception antenna 705 are arranged in different arrays. For example, although the electronic devices 400 and 450 of FIG. 4 are disposed in order of the transmission antenna 401, the camera 403, and the reception antenna 405, the electronic device 700 of FIG. 7 may be disposed in order of the camera 703, the transmission antenna 701, and the reception antenna 705, and the electronic device 750 may be disposed in order of the transmission antenna 701, the reception antenna 705, and the camera 703. The flowchart of FIG. 5 may be applied equally to the electronic devices 700 and 750 adjusting the focal length of the camera 703 through transmission antenna 701 and reception antenna 705. In addition, FIG. 7 discloses a case in which axes that are virtual lines extending in the horizontal direction and passing through the center of the transmission antenna 701, the reception antenna 705, and the camera 703 are the same, but a case that does not match as shown in FIG. 6 may also be applied.

Figure 8:
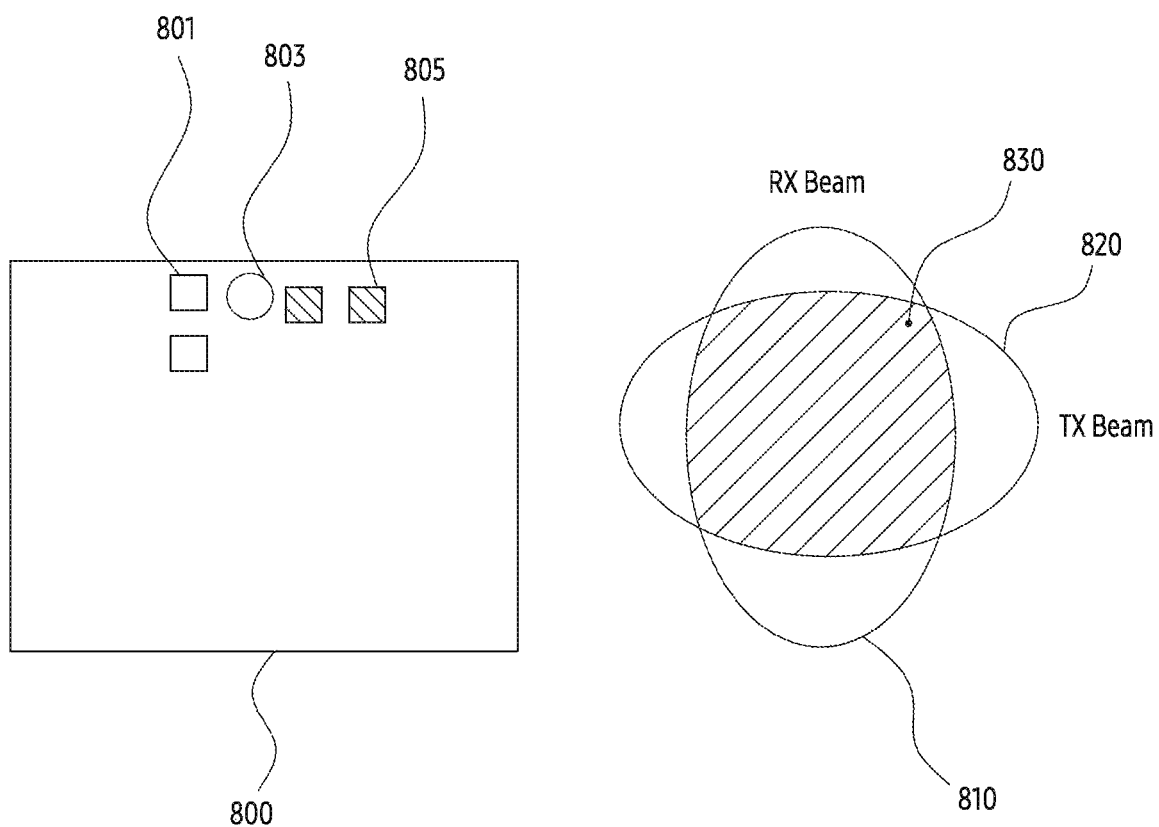
FIG. 8 illustrates an example of an electronic device including a plurality of transmission antennas and a plurality of reception antennas, and an example of an area of FoV according to a transmission beam and a reception beam according to an embodiment of the disclosure.

FIG. 8 illustrates an example of an electronic device including a plurality of transmission antennas and a plurality of reception antennas, and an example of an area of FoV according to a transmission beam and a reception beam according to an embodiment of the disclosure. FIG. 8 illustrates a case in which the transmission antenna is also configured as an array antenna, unlike the electronic devices of FIGS. 4 to 7 including a transmission antenna configured with one antenna element. The transmission beam refers to a beam formed by the transmission antenna, and the reception beam refers to a beam formed by the reception antenna.

Referring to FIG. 8, the electronic device 800 may include a transmission antenna 801, a camera 803, and a reception antenna 805. The electronic device 800 exemplifies the electronic device 101. The transmission antenna 801 may be an array antenna including a plurality of antenna elements. For example, the transmission antenna 801 may be an array antenna having a 1×2 (width×length) array. Accordingly, the transmission antenna 801 may form a beam 820 having a relatively narrow beamwidth in the length direction compared to the beamwidth in the width direction. The reception antenna 805 may be an array antenna including a plurality of antenna elements. For example, the reception antenna 805 may be an array antenna having a 2×1 (width×length) array. Accordingly, the reception antenna 805 may form a beam 820 having a relatively narrow beamwidth in the width direction compared to the beamwidth in the length direction. FIG. 8 illustrates the transmission antenna 801 and the reception antenna 805 including two antenna elements as an example, but the disclosure is not limited thereto. For example, the transmission antenna 801 may include three antenna elements 1×3 arranged vertically. In this case, the beam 820 formed by the transmission antenna 801 may be a beam having a narrower beam width in the vertical direction.

An area 830 where the beam 820 formed by the transmission antenna 801 overlaps the beam 810 formed by the reception antenna 805 may be defined as the FoV of the radar. Since the radar receives the transmitted signal and measures the distance to the object, the FoV of the radar may be determined based on the coverage (or beamwidth) of the transmission beam and the coverage of the reception beam. In addition, the performance of the radar may be determined based on the gain of the transmission antenna and the gain of the reception antenna as shown in the following equation.

$$P_{rx} = \frac{P_{tx} G_{tx} G_{rx} \sigma \lambda^2}{(4\pi)^2 R^4} \qquad \text{Equation 1}$$

The $P_{rx}$ may refer to reception power, the $P_{tx}$ may refer to transmission power, the $G_{tx}$ may refer to transmission antenna gain, the $G_{rx}$ may refer to the reception antenna, the σ may refer to the radar cross section (RCS) of the reflector, the above λ may refer to the wavelength of the signal, and the R may refer to the distance to the object.

Referring to Equation 1, the performance of the radar may be related to the reception performance of the transmitted signal, and the reception performance may be determined according to the power of the reception signal. Therefore, the performance of radar may be improved not only when the number of antenna elements of reception antenna 805 increases, but also when the number of antenna elements of transmission antenna 801 increases. However, since it is necessary to match the FoV of the radar and the FoV of the camera for more precise distance measurement, the electronic device 800 may control the configuration of an antenna element configuring the transmission antenna 801 and the reception antenna 805. In addition, the electronic device 800 may determine the configuration of the transmission antenna 801 and the reception antenna 805 in consideration of the realizable space and arrangement of the electronic device 800.

Figure 9A:
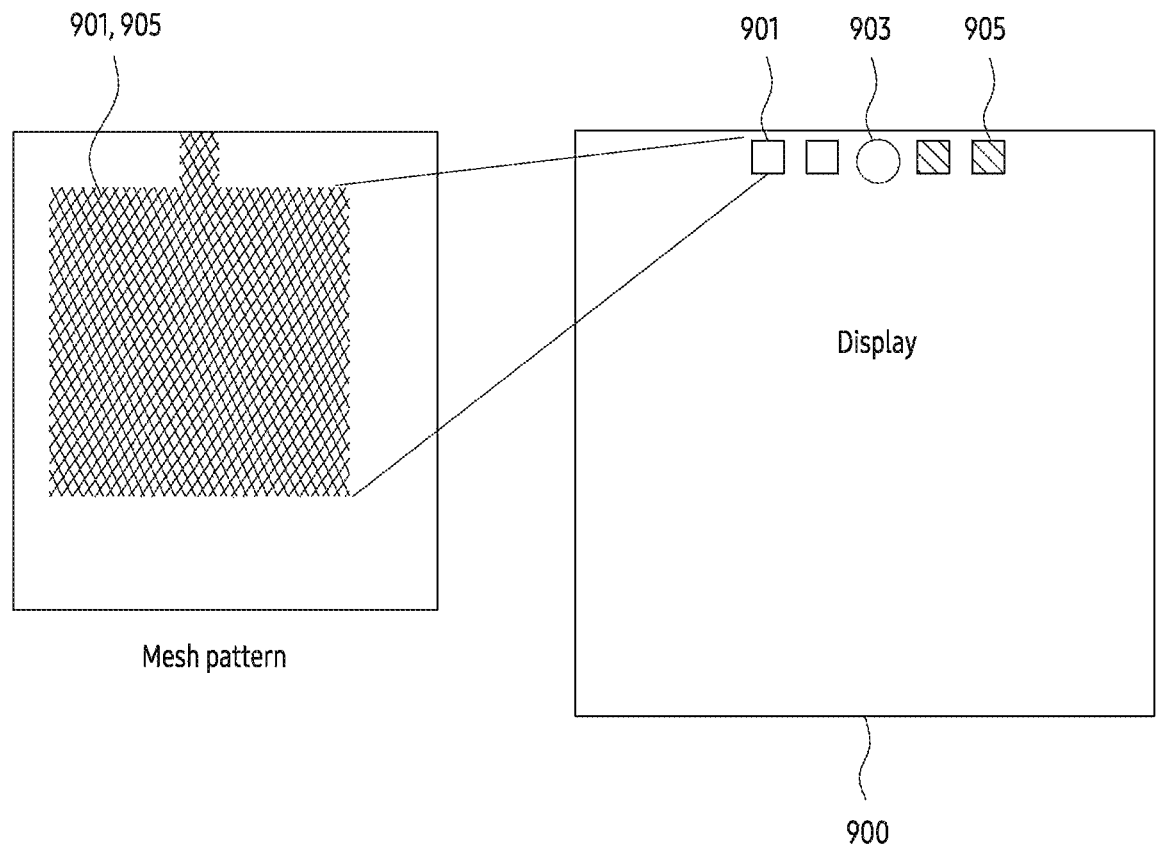
FIG. 9A illustrates an example of an antenna disposed in a display area of an electronic device according to an embodiment of the disclosure.

FIG. 9A illustrates an example of an antenna disposed in a display area of an electronic device according to an embodiment of the disclosure. A plurality of antennas of the electronic device 900 of FIG. 9A may include a transmission antenna and a reception antenna. The electronic device 900 exemplifies the electronic device 101. The transmission antenna may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 9A, the electronic device 900 may include a transmission antenna 901, a camera 903, and a reception antenna 905. Assuming that a direction in which the display of the electronic device 900 is disposed is the front of the electronic device 900, the transmission antenna 901, the camera 903, and the reception antenna 905 may be disposed on the front of the electronic device 900. The transmission antenna 901 and the reception antenna 905 may include at least one antenna element. For example, each of the transmission antenna 901 and the reception antenna 905 may include two antenna elements 1×2. In this case, the antenna elements may be disposed to be spaced apart from each other by a predetermined distance.

Each antenna element of the transmission antenna 901 may be configured in various types. Each antenna element of the reception antenna 905 may be configured in various types. For example, each antenna element may be one of a dipole antenna, a monopole antenna, a patch antenna, a loop antenna, and an inverted F antenna (IFA). In addition, in the case of transmission antenna 901 and reception antenna 905 disposed in the area of the display, each antenna element may be configured in a transparent mesh pattern. For example, when the antenna elements of transmission antenna 901 and reception antenna 905 is configured with patch antennas, they may be formed as shown in FIG. 9A. For example, the transmission antenna 901 and the reception antenna 905 may be configured in a mesh pattern, and a power supply line for the transmission antenna 901 and the reception antenna 905 may also be configured in a mesh pattern. The power supply line may be located at the upper part based on the transmission antenna 901 and the reception antenna 905. However, the disclosure is not limited thereto, and the power supply line may be located for the transmission antenna 901 and the reception antenna 905 in consideration of locations of the transmission antenna 901 and the reception antenna 905 disposed in the electronic device 900 and other components of the electronic device 900. By using an antenna element configured in a mesh pattern, the electronic device 900 may be configured to adjust the focal length of the camera 903 while minimizing the effect on visual information displayed to the outside through the display.

Figure 9B:
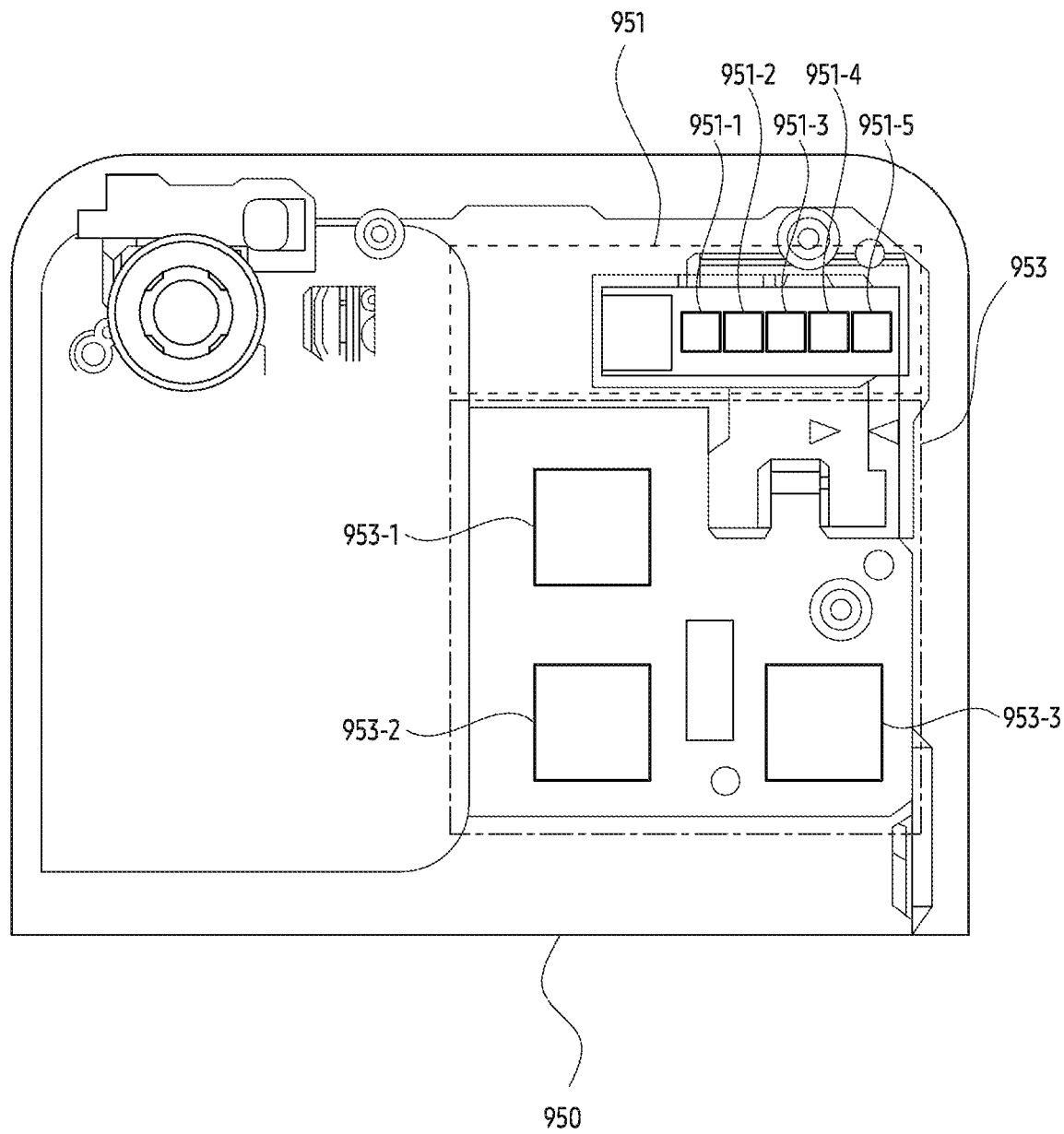
FIG. 9B illustrates an example of an electronic device including an antenna disposed on a rear surface of the electronic device to adjust the focus of a camera according to an embodiment of the disclosure.

FIG. 9B illustrates an example of an electronic device including an antenna disposed on a rear surface of the electronic device to adjust the focus of the camera according to an embodiment of the disclosure. A plurality of antennas of the electronic device 950 of FIG. 9B may include a transmission antenna and a reception antenna. The electronic device 950 exemplifies the electronic device 101. The transmission antenna 901 may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 9B, the electronic device 950 may include a module 951 (hereinafter referred to as a mmWave module) for transmitting and receiving signals in the mmWave band and a module 953 (hereinafter referred to as a UWB module) for transmitting and receiving signals in the ultra-wave band (UWB) band. The mmWave module 951 and the UWB module 953 may be disposed on the rear surface of the electronic device 900 in the opposite direction to the display disposed on the front surface of the electronic device 900 of FIG. 9A. But it is only for convenience of explanation, and the disclosure is not limited thereto. For example, the mmWave module 951 or the UWB module 953 may be disposed on the front surface of the electronic device 950, the side surface, or the front surface, side surface, and rear surface in continuous. A radar (or antenna) for the electronic device 950 of the disclosure to adjust the focal length of the camera may use the mmWave module 951 or the UWB module 953. Accordingly, the focal length of the camera may be adjusted using the module of the electronic device 950.

For example, the mmWave module 951 may include 1×5 antenna radiators 951-1, 951-2, 951-3, 951-4, and 951-5. For example, the UWB module 953 may include L-type (1×2 & 2×1) antenna radiators 953-1, 953-2, and 953-3. However, the number of antenna radiators included in the structure according to an embodiment of the disclosure is not limited thereto.

Figure 10:
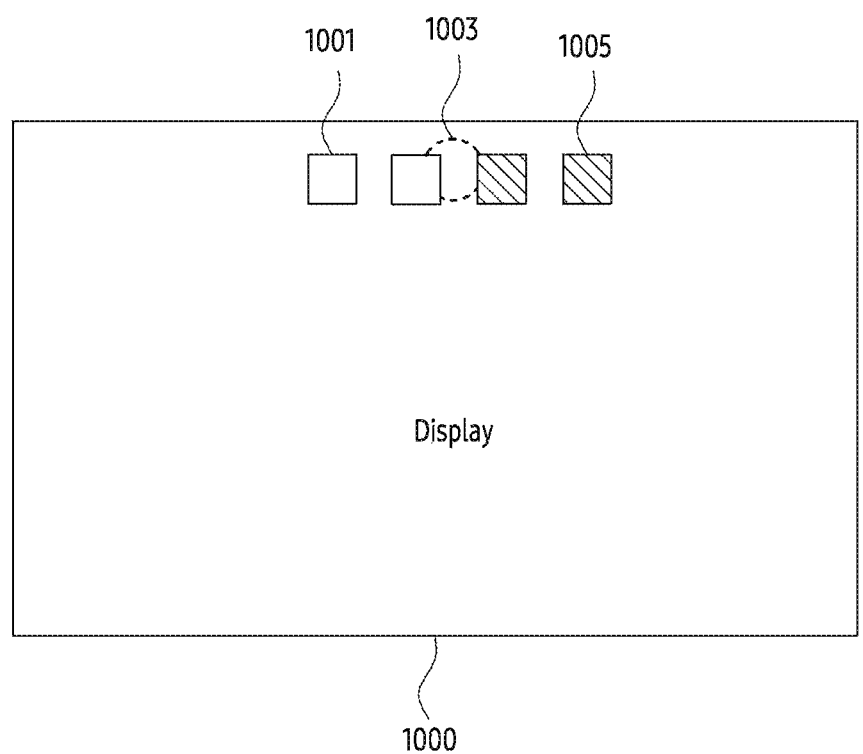
FIG. 10 illustrates an example of an arrangement between a camera and an antenna of an electronic device including an under display camera (UDC) according to an embodiment of the disclosure.

FIG. 10 illustrates an example of an arrangement between a camera and an antenna of an electronic device including an under display camera (UDC) according to an embodiment of the disclosure. A plurality of antennas of the electronic device 1000 of FIG. 10 may include a transmission antenna and a reception antenna. The electronic device 1000 exemplifies the electronic device 101. The transmission antenna may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 10, the electronic device 1000 may include a transmission antenna 1001, a camera area 1003, and a reception antenna 1005. For example, the transmission antenna 1001 and the reception antenna 1005 may each include two antenna elements 2×1. The transmission antenna 1001, the camera area 1003, and the reception antenna 1005 of the electronic device 1000 may be disposed on an area where the display is disposed (i.e., the front surface of the electronic device 1000). In particular, the camera area 1003 may represent the area for the under display camera (UDC) disposed (or mounted) on the lower surface of the display. For example, the camera area may also be referred to as a camera hole or a camera window area.

In the case of the camera area 1003 for the UDC, at least a part of the transmission antenna 1001 or the reception antenna 1005 may overlap the camera area 1003. For example, a part of the antenna element of at least one antenna element of the transmission antenna 1001 may overlap a part of the camera area 1003. A part of the antenna element among a plurality of antenna elements of the reception antenna 1005 may overlap a part of the camera area 1003. Herein, a part of the antenna element may mean all or part of an area occupied by one antenna element. For example, FIG. 10 illustrates that a part of the area of one antenna element of the transmission antenna 1001 overlap the camera area 1003.

The overlapping of the transmission antenna 1001 and the reception antenna 1005 with the camera area 1003 may be determined based on other components (e.g., sensors, and the like) located in the front surface of the electronic device 1000, information displayed on the display, and the performance of the camera (e.g., UDC) located in the camera area 1003. For example, in consideration of the implementation area of other components, the transmission antenna 1001 and the reception antenna 1005 may overlap the camera area 1003. In order to avoid covering the information displayed on the display, the transmission antenna 1001 and the reception antenna 1005 may overlap the camera area 1003. In addition, based on the effective range of the camera area 1003, the transmission antenna 1001 and the reception antenna 1005 may overlap the camera area 1003. Herein, the effective range of the camera area 1003 may mean an area in which a camera of the camera area 1003 may identify an external object.

As described above, in the case of the camera area 1003 including UDC, the electronic device 1000 may include at least a portion of the transmission antenna 1001 or the reception antenna 1005 overlapping the camera area 1003. Accordingly, the electronic device 1000 may include antennas for adjusting focus of the camera located in the camera area 1003 while considering the arrangement of other components of the electronic device 1000, and effectively adjust the focus within a range that does not affect the performance of the camera located in the camera area 1003.

Figure 11:
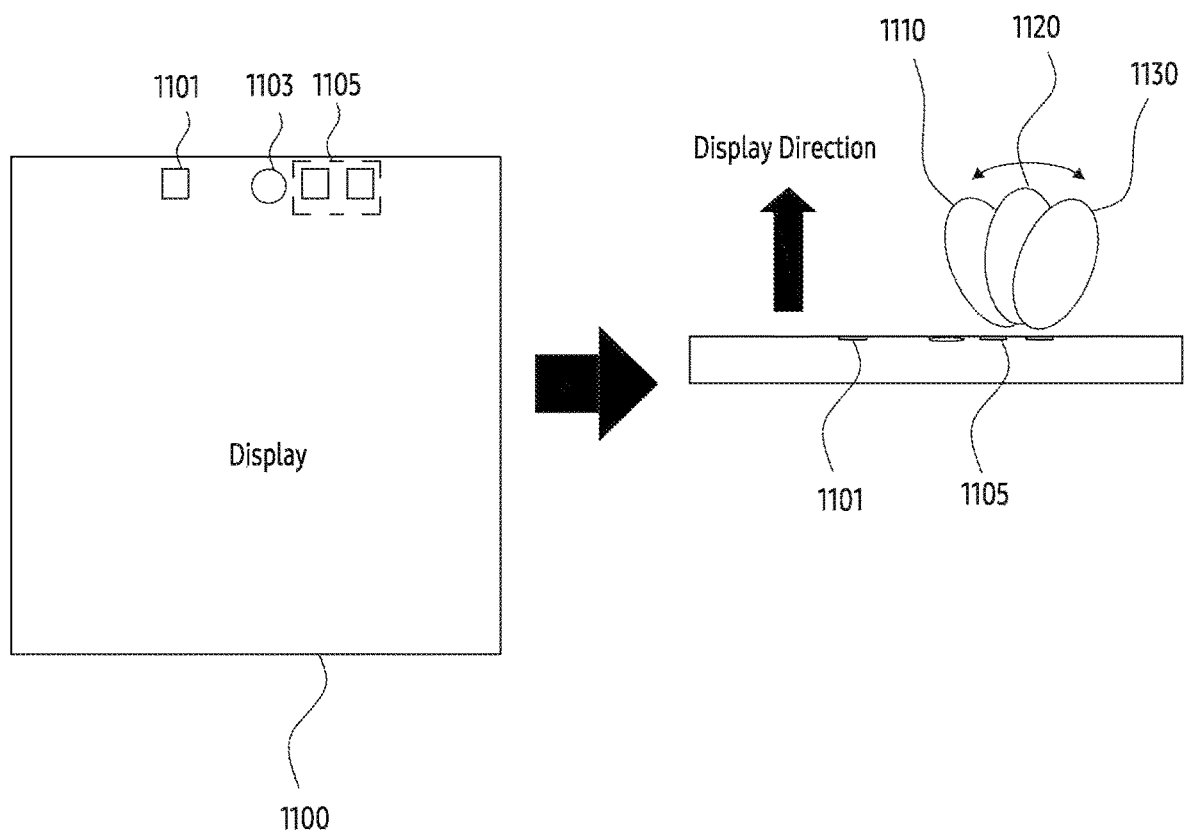
FIG. 11 illustrates an example of a method using beamforming to adjust the focus of a camera in an electronic device including a plurality of antennas according to an embodiment of the disclosure.

FIG. 11 illustrates an example of a method using beamforming to adjust the focus of a camera in an electronic device including a plurality of antennas according to an embodiment of the disclosure. A plurality of antennas of the electronic device 1100 of FIG. 11 may include a transmission antenna and a reception antenna. The electronic device 1100 exemplifies the electronic device 101. The transmission antenna may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 11, the electronic device 1100 may include a transmission antenna 1101, a camera 1103, and a reception antenna 1105. The transmission antenna 1101, the camera 1103, and the reception antenna 1105 may be disposed in the display area of the electronic device 1100.

The electronic device 1100 may expand the FoV of the radar to correspond to the FoV of the camera by using beamforming. For example, the electronic device 1100 assumes a case in which three beams 1110, 1120, and 1130 may be formed by using the reception antenna 1105, and the beamwidth of each beam is 50° and the FoV of the camera 1103 is 70°. Since one beam formed by the electronic device 1100 through the reception antenna 1105 has a narrower coverage than the FoV of the camera 1103, the FoV of the radar of the electronic device 1100 and the FoV of the camera 1103 may not match each other. Therefore, the electronic device 1100 may cover all areas corresponding to the FoV of the camera 1103 through three beams 1110, 1120, and 1130 by sweeping a plurality of beams formed through beamforming.

As described above, the electronic device 1100 may adjust the FoV of the radar corresponding to the FoV of the camera 1103 through beamforming, and may effectively adjust the focal length of the camera 1103.

Figure 12A:
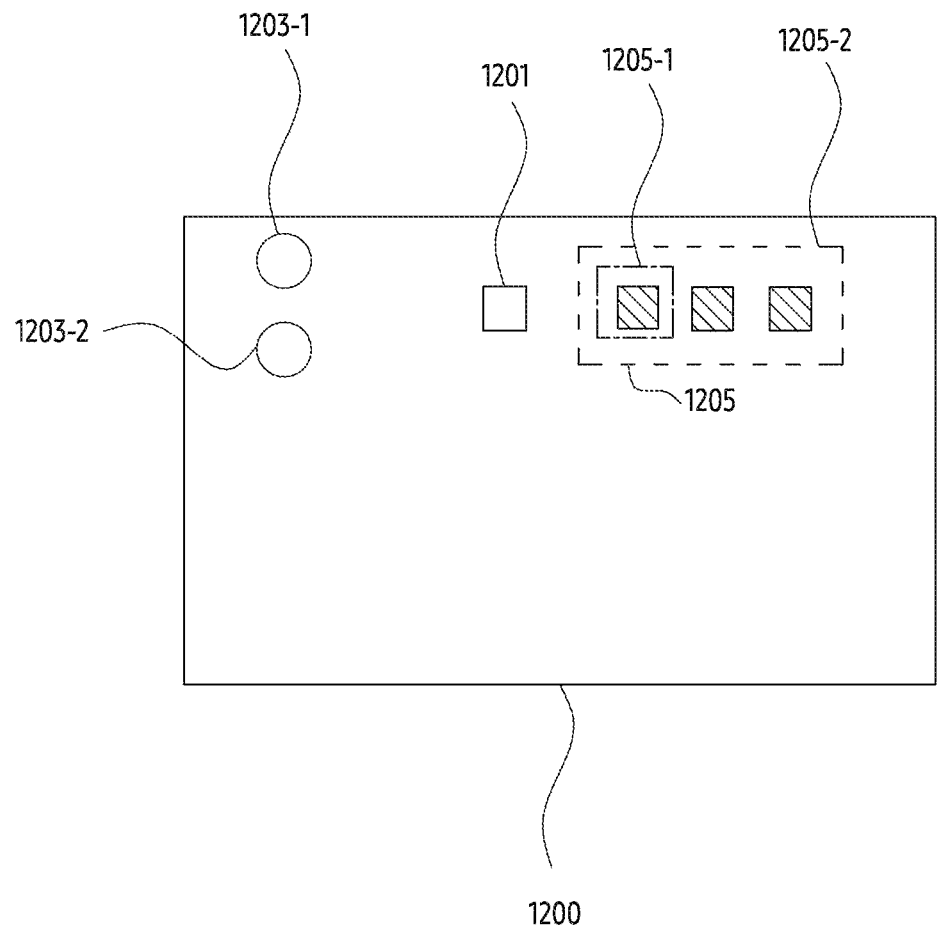
FIG. 12A illustrates an example of an electronic device including a plurality of antennas for adjusting focus of the camera in an electronic device including a plurality of cameras according to an embodiment of the disclosure.

FIG. 12A illustrates an example of an electronic device including a plurality of antennas for adjusting focus of the camera in an electronic device including a plurality of cameras according to an embodiment of the disclosure. A plurality of antennas of the electronic device 1200 of FIG. 12A may include a transmission antenna and a reception antenna. The electronic device 1200 exemplifies the electronic device 101. The transmission antenna may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 12A, the electronic device 1200 may include a transmission antenna 1201, a first camera 1203-1, a second camera 1203-2, and a reception antenna 1205. The first camera 1203-1 and the second camera 1203-2 may have different FoV. For example, the first camera 1203-1 may have a FoV having a value greater than the second camera 1203-2. In other words, since the first camera 1203-1 has the FoV having a value greater than the second camera 1203-2, a wider area may be identified. Referring to FIG. 12A, the electronic device 1200 including two cameras is described as an example, but the disclosure is not limited thereto. For example, the electronic device 1200 may include 3, 4, 5, or 6 or more cameras.

The electronic device 1200 may receive a signal by varying the configuration of the reception antenna 1205 by identifying whether the camera 1203-1 or 1203-2 having a different FoV is operating. For example, when identifying that the first camera 1203-1 is operating, the electronic device 1200 may configure only one antenna element 1205-1 to operate as the reception antenna 1205 corresponding to a relatively wide FoV of the camera, and receive a signal through the antenna element 1205-1.

Alternatively, when identifying that the second camera 1203-2 is operating, the electronic device 1200 can configure antenna elements 1205-2 to operate as the reception antenna 1205 in response to the FoV of a relatively narrow camera, and receive a signal through antenna elements 1205-2. As described above, an operation in which the electronic device 1200 identifies an operating camera among a plurality of cameras may be performed before operation 501 of FIG. 5.

Figure 12B:
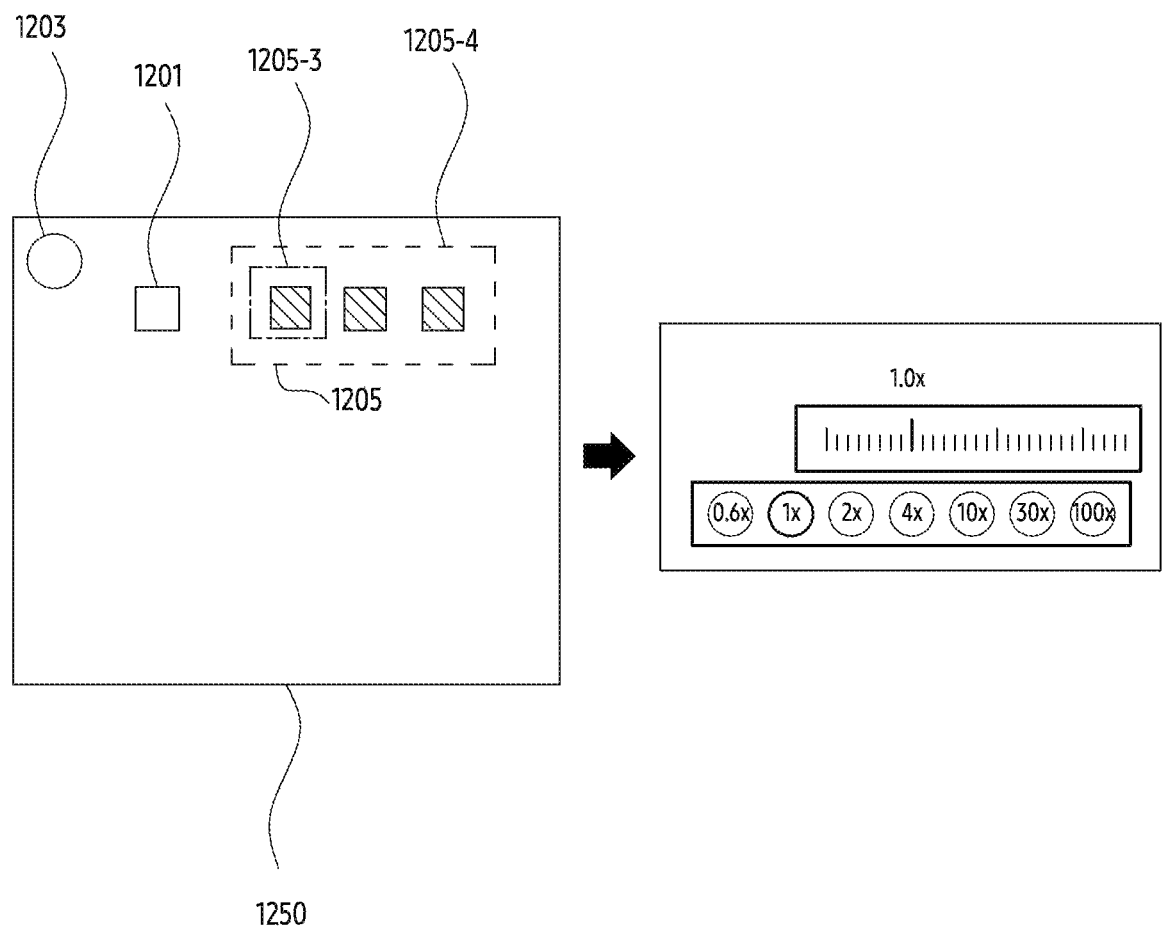
FIG. 12B illustrates an example of an electronic device including a plurality of antennas to adjust the focus of a camera when the zoom of the camera changes according to an embodiment of the disclosure.

FIG. 12B illustrates an example of an electronic device including a plurality of antennas to adjust the focus of a camera when the zoom of the camera changes according to an embodiment of the disclosure. A plurality of antennas of the electronic device 1250 of FIG. 12B may include a transmission antenna and a reception antenna. The electronic device 1250 exemplifies the electronic device 101. The transmission antenna may include at least one antenna element, and the reception antenna may include a plurality of antenna elements. Hereinafter, for convenience of explanation, an electronic device including a transmission antenna and a reception antenna as separate antennas will be described as an example. However, it is not limited thereto, and the embodiment of disclosure may also include cases where signals are transmitted through a part of antenna elements and received through another part of antenna elements including the part or still another part of antenna element that does not include the part, among a plurality of antenna elements.

Referring to FIG. 12B, the electronic device 1250 may include a transmission antenna 1201, a camera 1203, and a reception antenna 1205. Here, the zoom of the camera 1203 may mean a magnification of an image identified and obtained through the camera 1203. In addition, zooming in and zooming out of the camera 1203 may mean digital zoom.

The electronic device 1250 may substantially change the FoV of the camera 1203 by zooming in and zooming out of the camera 1203. For example, when assuming that the magnification of an image obtained in a default state of the camera 1203 is 1.0×, the electronic device 1250 may enlarge (greater than 1.0×) the magnification of the image through zoom-in or reduce (less than 1.0×) the magnification of the image through zoom-out. When zooming in, an area of the image obtained through the camera 1203 is narrowed, and thus the FoV of the camera 1203 may be substantially reduced. When zooming out, the area of the image obtained through the camera 1203 is expanded, and thus the FoV of the camera 1203 may substantially increase.

The electronic device 1250 may identify whether a command for zoom-in or zoom-out of the camera 1203 is triggered. Based on identifying that the command is triggered, the electronic device 1250 may receive a signal by changing the configuration of the reception antenna 1205. For example, when identifying a command to perform a zoom out for the zoom of the camera 1203, the electronic device 1250 may be configured to operate only one antenna element 1205-3 as the reception antenna 1205 corresponding to a relatively wide FoV of the camera, and receive a signal through the antenna element 1205-3. Alternatively, when identifying a command to perform a zoom-in on camera 1203, the electronic device 1250 may be configured to operate the antenna elements 1205-4 as the reception antenna 1205 corresponding to a relatively narrow FoV of the camera, and receive a signal through the antenna elements 1205-4. As described above, an operation in which the electronic device 1250 identifies whether a zoom-in/zoom-out command of the camera 1203 is triggered may be performed before operation 501 of FIG. 5.

Figure 13:
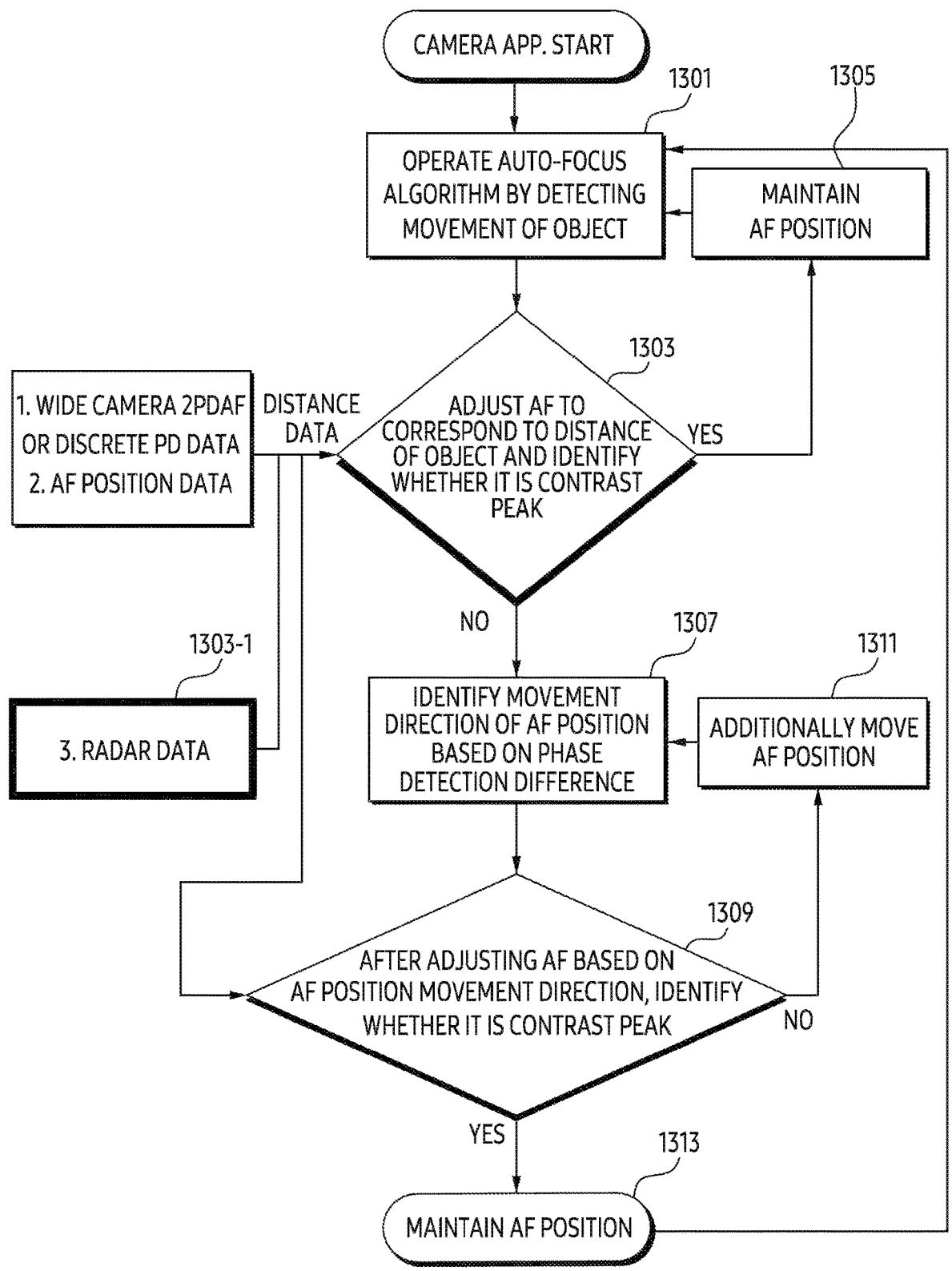
FIG. 13 is a flowchart illustrating an example of an auto-focusing algorithm based on radar data according to an embodiment of the disclosure.

FIG. 13 is a flowchart illustrating an example of an auto-focusing algorithm based on radar data according to an embodiment of the disclosure. The auto-focusing algorithm of FIG. 13 is an algorithm for automatically adjusting the focus of the camera, and it may be performed by an electronic device (e.g., the electronic device 101) of the disclosure or at least one processor (e.g., the processor 120) of the electronic device 101. Hereinafter, auto focus (AF) may mean a focus (or focal length) of the camera.

Referring to FIG. 13, the electronic device 101 may identify that an application related to a camera is executed.

In operation 1301, the electronic device 101 may operate an auto-focus (or auto-focusing) algorithm by detecting movement of an object in the FoV of the camera.

In operation 1303, the electronic device 101 may adjust the AF to correspond to the distance of the object and identify whether it is a contrast peak. In operation 1303, the electronic device may identify whether it is a contrast peak based on information on the distance. The information on the distance may include dual pixel-phase detection auto focus (2PDAF) of a wide camera or discrete phase detection data (PD data). In addition, the information on the distance may include radar data 1303-1 of the electronic device. The radar data 1303-1 may include information on a distance from an electronic device to an object identified by a radar (or antenna). The contrast peak refers to a point where the contrast is the maximum level. Performing auto focusing based on the contrast peak is to analyze based on the light entering through the lens of the camera. This is because the contrast level is high and the focus of the camera is most accurately adjusted when the light passing through the lens of the camera shows the maximum contrast.

In operation 1303, when the electronic device 101 identifies that it is a contrast peak, it may enter operation 1305 and maintain the AF position. Thereafter, the electronic device may perform operation 1301 when detecting movement of an object. In operation 1303, when the electronic device 101 identifies that it is not a contrast peak, the electronic device may enter operation 1307.

In operation 1307, the electronic device 101 may identify a movement direction of the AF position based on a phase detection difference. The electronic device 101 may identify the movement direction of the AF position by detecting the phase difference of different light entering through the lenses of the camera. Thereafter, in operation 1309, the electronic device 101 may adjust the AF based on the identified AF position movement direction and identify whether it is a contrast peak. In operation 1309, when the electronic device 101 identifies that it is not a contrast peak, it may enter operation 1311. In operation 1311, the electronic device 101 may additionally move the AF position, and may enter operation 1307 again to identify the AF position movement direction based on the phase detection difference. In operation 1309, when the electronic device 101 identifies that it is a contrast peak, the electronic device 101 may enter operation 1313 and maintain the AF position. Thereafter, the electronic device 101 may perform operation 1301 when detecting movement of an object.

Referring to FIGS. 1 to 8, 9A, 9B, 10, 11, 12A, 12B, and 13, a device and a method including a plurality of antennas according to embodiments of the disclosure disclose a technology for finely adjusting the focus of a camera. In adjusting the focus of the camera, the electronic device may differently configure the number of antenna elements of the antenna performing the radar function. Accordingly, the electronic device may adjust the width of the beam (or the beam coverage, the field of view (FoV) of the radar) formed by the antenna to a value corresponding to the FoV of the camera. The electronic device may measure and calculate a distance to an object through a signal transmitted and received according to the number of identified antenna elements, and adjust the focal length of the camera based on the identified distance. The electronic device may obtain a clear image including an external object in the FoV of the camera through a camera with the adjusted focal length. Accordingly, according to a device and a method including a plurality of antennas according to embodiments of the disclosure, there is no need for a separate mounting space, compared to a device and a method including separate sensors that may measure distances (e.g., Lidar, ToF sensors, and the like), and a device and a method including ranging sensors. In addition, since additional parts are not required, the manufacturing process may be simplified and production costs may be reduced.

According to various embodiments, an electronic device (101, 400, 450, 700, 750, 800, 900, 950, 1000, 1100, 1200, 1250) may comprise a first antenna element (401). An electronic device (101, 400, 450, 700, 750, 800, 900, 950, 1000, 1100, 1200, 1250) may comprise an array antenna (405) including a plurality of second antenna elements spaced apart from each other. An electronic device (101, 400, 450, 700, 750, 800, 900, 950, 1000, 1100, 1200, 1250) may comprise a camera (403). An electronic device (101, 400, 450, 700, 750, 800, 900, 950, 1000, 1100, 1200, 1250) may comprise a processor (120) coupled to the first antenna element (401), the array antenna (405), and the camera (304). The processor (120) may be configured to identify an FoV of the camera (403). The processor (120) may be configured to identify a distance from an external object within the FoV by using: the first antenna element (401) and a first set of at least one antenna element of the plurality of the second antenna elements (405), based on the FoV as a first value. The processor (120) may be configured to identify a distance from the external object within the FoV by using the first antenna element (401) and a second set of at least one antenna element of the plurality of the second antenna elements (405), based on the FoV as a second value different from the first value. The processor (120) may be configured to adjust a focus distance of the camera (304) based on the identified distance. The processor (120) may be configured to obtain an image for the external object through the camera (403) having the adjusted focus distance.

In one embodiment, at least one of a first area where a first coverage of a first beam formed based on the first set of at least one antenna element and a second coverage of a second beam formed based on the first antenna element (401) overlap, or a second area where a third coverage of a third beam formed based on the second set of at least one antenna element and the second coverage of the second beam formed based on the first antenna element (401) overlap, correspond to the FoV.

In one embodiment, each of the first antenna element (401) and the plurality of second antenna elements (405) is disposed along with a virtual line passing through a center of the camera (403).

In one embodiment, the processor (120) may be further configured to adjust the identified distance based on first information on a second distance between the first antenna element (401) and the camera (403), second information on a first distance between the camera (403) and the first set or the second set of at least one antenna element, a first angle of arrival, AoA, to the external object from the camera (403), and a second AoA to the external object from the first set of at least one antenna element or the second set of at least one antenna element.

In one embodiment, the electronic device (101, 400, 450, 700, 750, 800, 900, 950, 1000, 1100, 1200, 1250) may further comprise a display. The first antenna element (401), the camera (403), and the array antenna (405) may be disposed on a surface of the display. Each of the first antenna element (401) and the plurality of second antenna elements (405) may be configured in a mesh pattern.

In one embodiment, the electronic device (101, 400, 450, 700, 750, 800, 900, 950, 1000, 1100, 1200, 1250) may further comprise a display. Each of the first antenna element (401) and the plurality of second antenna elements (405) may be configured as a UWB module disposed on a surface opposite to another surface of the electronic device (101, 400, 450, 700, 750, 800, 900, 950, 1000, 1100, 1200, 1250) in which the display is disposed.

In one embodiment, the electronic device (101, 400, 450, 700, 750, 800, 900, 950, 1000, 1100, 1200, 1250) may further comprise a display. The camera (403) may be configured as a UDC disposed on a lower surface of the display. At least a part of the first antenna element (401) may be disposed to overlap the camera (403) or at least a part of the plurality of second antenna elements (405) be disposed to overlap the camera (403).

In one embodiment, the processor (120) may be further configured to identify whether a coverage of each of beams formable by the plurality of second antenna elements (405) is smaller than the FoV of the camera (403). The processor (120) may be further configured to, in response to the coverage being identified as being smaller than the FoV of the camera (403), identify the distance from the external object within the FoV by using the beams and a beam formed by the first antenna element (401).

In one embodiment, the electronic device (101, 400, 450, 700, 750, 800, 900, 950, 1000, 1100, 1200, 1250) may further comprise another array antenna (801) different from the array antenna (405). The first antenna element (401) may be included in the another array antenna (801). An area where a first coverage of a first beam formed based on the first set of at least one antenna element and a fourth coverage of a fourth beam formed based on the another array antenna (801) overlap may correspond to the FoV of the camera (403).

In one embodiment, the FoV of the camera (403) may comprise a first FoV for a horizontal component and a second FoV for a vertical component. Array antenna (405) may be determined based on the first FoV and the second FoV.

In one embodiment, the electronic device (101, 400, 450, 700, 750, 800, 900, 950, 1000, 1100, 1200, 1250) may further comprise a plurality of cameras (1203-1, 1203-2) including the camera (403, 1203-1). A FoV of another camera (1203-2) of the plurality of cameras (1203-1, 1203-2) is smaller than the FoV of the camera (403, 1203-1). The processor (120) may be configured to identify whether the camera (403, 1203-1) operates or the another camera (1203-2) operates. The processor (120) may be configured to, in response to identifying that the another camera (1203-2) operates, identify the distance from the external object within the FoV of the another camera (1203-2) by using the first antenna element (401, 1201) and a third set of at least one antenna element (1205-2) of the plurality of second antenna elements (405), based on a value of the FoV of the another camera (1203-2).

In one embodiment, the FoV of the camera (403, 1203) may have the first value in response to magnification of an image obtained through the camera (403, 1203) being first magnification. The FoV of the camera (403, 1203) may have the second value in response to the magnification of the image obtained through the camera (403, 1203) being a second magnification different from the first magnification.

According to various embodiments, a method performed by an electronic device (101, 400, 450, 700, 750, 800, 900, 950, 1000, 1100, 1200, 1250) may comprise identifying a field of view (FoV) of a camera (403) of the electronic device (101, 400, 450, 700, 750, 800, 900, 950, 1000, 1100, 1200, 1250). A method may comprise identifying a distance from an external object within the FoV by using: a first antenna element (401) and a first set of at least one antenna element of a plurality of a second antenna elements (405) included in an array antenna (405) of the electronic device (101, 400, 450, 700, 750, 800, 900, 950, 1000, 1100, 1200, 1250), based on the FoV as a first value, and the first antenna element (401) and a second set of at least one antenna element of the plurality of the second antenna elements (405), based on the FoV as a second value different from the first value. A method may comprise adjusting a focus distance of the camera (304) based on the identified distance. A method may comprise obtaining an image for the external object through the camera (403) having the adjusted focus distance.

In one embodiment, at least one of a first area where a first coverage of a first beam formed based on the first set of at least one antenna element and a second coverage of a second beam formed based on the first antenna element (401) overlap, or a second area where a third coverage of a third beam formed based on the second set of at least one antenna element and the second coverage of the second beam formed based on the first antenna element (401) overlap, may correspond to the FoV.

In one embodiment, each of the first antenna element (401) and the plurality of second antenna elements (405) may be disposed along with a virtual line passing through a center of the camera (403).

In one embodiment, the method may further comprise adjusting the identified distance based on first information on a second distance between the first antenna element (401) and the camera (403), second information on a first distance between the camera (403) and the first set or the second set of at least one antenna element, a first angle of arrival, AoA, to the external object from the camera (403), and a second AoA to the external object from the first set of at least one antenna element or the second set of at least one antenna element.

In one embodiment, the method may further comprise identifying whether a coverage of each of beams formable by the plurality of second antenna elements (405) is smaller than the FoV of the camera (403). The method may further comprise, in response to the coverage being identified as being smaller than the FoV of the camera (403), identifying the distance from the external object within the FoV using the beams and a beam formed by the first antenna element (401).

In one embodiment, the FoV of the camera (403) may comprise a first FoV for a horizontal component and a second FoV for a vertical component. Array antenna (405) may be determined based on the first FoV and the second FoV.

In one embodiment, the method may further comprise identifying whether the camera (403, 1203-1) operates or another camera (1203-2) of the electronic device operates, The method may further comprise, in response to identifying that the another camera (1203-2) operates, identifying the distance from the external object within a FoV of the another camera (1203-2) by using the first antenna element (401, 1201) and a third set of at least one antenna element (1205-2) of the plurality of second antenna elements (405) based on a value of the FoV of the another camera (1203-2). The FoV of the another camera (1203-2) may be smaller than the FoV of the camera (403, 1203-1).

In one embodiment, the FoV of the camera (403, 1203) may have the first value in response to magnification of an image obtained through the camera (403, 1203) being a first magnification. The FoV of the camera (403, 1203) may have the second value in response to the magnification of the image obtained through the camera (403, 1203) being a second magnification different from the first magnification.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first antenna element configured to transmit signals;
an array antenna, configured to receive signals reflected by an external object, including a plurality of second antenna elements spaced apart from each other;
a camera;
memory storing instructions; and
at least one processor communicatively coupled to the first antenna element, the array antenna, the camera, and the memory,
wherein the instructions, when executed by the at least one processor individually or collectively, cause the electronic device to:
identify information on a field of view (FoV) of the camera,
determine a distance from the external object within the FoV of the camera by using:
the first antenna element and a first set of at least one antenna element of the plurality of the second antenna elements, in a case that the FoV of the camera corresponds to a first value, and
the first antenna element and a second set of at least one antenna element of the plurality of the second antenna elements in a case that the FoV of the camera corresponds to a second value different from the first value, wherein the second set is different from the first set,
adjust a focus distance of the camera based on the determined distance, and
obtain an image for the external object through the camera having the adjusted focus distance.

2. The electronic device of claim 1, wherein the FoV of the camera corresponds to at least one of:
a first area where a first coverage of a first beam formed based on the first set of at least one antenna element and a second coverage of a second beam formed based on the first antenna element overlap, or
a second area where a third coverage of a third beam formed based on the second set of at least one antenna element and the second coverage of the second beam formed based on the first antenna element overlap.

3. The electronic device of claim 1, wherein each of the first antenna element and the plurality of second antenna elements is disposed along with a virtual line passing through a center of the camera.

4. The electronic device of claim 1, wherein the distance from the external object is determined based on:
first information on a distance between the first antenna element and the camera,
second information on a distance between the camera and the first set of at least one antenna element or the second set of at least one antenna element,
a first angle of arrival (AoA) to the external object from the camera, and
a second AoA to the external object from the first set of at least one antenna element or the second set of at least one antenna element.

5. The electronic device of claim 1, further comprising:
a display,
wherein the first antenna element, the camera, and the array antenna are disposed on a surface of the display, and
wherein each of the first antenna element and the plurality of second antenna elements is configured in a mesh pattern.

6. The electronic device of claim 1, further comprising:
a display,
wherein each of the first antenna element and the plurality of second antenna elements is configured as an ultra-wideband (UWB) module disposed on a surface opposite to another surface of the electronic device in which the display is disposed.

7. The electronic device of claim 1, further comprising:
a display,
wherein the camera is configured as an under display camera (UDC) disposed on a lower surface of the display, and wherein at least a part of the first antenna element is disposed to overlap the camera or at least a part of the plurality of second antenna elements is disposed to overlap the camera.

8. The electronic device of claim 1, wherein the instructions, when executed by the at least one processor individually or collectively, further cause the electronic device to:
determine whether a coverage of each of beams formable by the plurality of second antenna elements is smaller than the FoV of the camera, and
in accordance with a determination that the coverage is smaller than the FoV of the camera, determine the distance from the external object within the FoV of the camera by using the beams and a beam formed by the first antenna element.

9. The electronic device of claim 1, further comprising:
another array antenna different from the array antenna,
wherein the first antenna element is included in the another array antenna, and
wherein an area where a first coverage of a first beam formed based on the first set of at least one antenna element and a fourth coverage of a fourth beam formed based on the another array antenna overlap corresponds to the FoV of the camera.

10. The electronic device of claim 1,
wherein the FoV of the camera comprises a first FoV for a horizontal component and a second FoV for a vertical component, and
wherein the array antenna is determined based on the first FoV and the second FoV.

11. The electronic device of claim 1, further comprising:
another camera,
wherein the instructions, when executed by the at least one processor individually or collectively, further cause the electronic device to:
determine whether the camera operates or the another camera operates, and
in accordance with a determination that the another camera operates, determine the distance from the external object within the FoV of the another camera by using the first antenna element and a third set of at least one antenna element of the plurality of second antenna elements, based on the FoV of the another camera.

12. The electronic device of claim 1,
wherein the FoV of the camera has the first value in accordance with a first magnification of the camera, and
wherein the FoV of the camera has the second value in accordance with a second magnification of the camera different from the first magnification of the camera.

13. A method performed by an electronic device, the method comprising:
identifying information on a field of view (FoV) of a camera of the electronic device;
determining a distance from an external object within the FoV of the camera by using:
a first antenna element and a first set of at least one antenna element of a plurality of second antenna elements included in an array antenna of the electronic device in a case that the FoV of the camera corresponds to a first value, and
the first antenna element and a second set of at least one antenna element of the plurality of the second antenna elements in a case that the FoV of the camera corresponds to a second value different from the first value, wherein the second set is different from the first set;
adjusting a focus distance of the camera based on the determined distance; and
obtaining an image for the external object through the camera having the adjusted focus distance,
wherein the first antenna element is configured to transmit signals, and
wherein the array antenna is configured to receive signals reflected by the external object.

14. The method of claim 13, wherein the FoV of the camera corresponds to at least one of:
a first area where a first coverage of a first beam formed based on the first set of at least one antenna element and a second coverage of a second beam formed based on the first antenna element overlap, or
a second area where a third coverage of a third beam formed based on the second set of at least one antenna element and the second coverage of the second beam formed based on the first antenna element overlap.

15. The method of claim 13, wherein each of the first antenna element and the plurality of second antenna elements is disposed along with a virtual line passing through a center of the camera.

16. The method of claim 13, wherein the distance from the external object is identified based on:
first information on a distance between the first antenna element and the camera,
second information on a distance between the camera and the first set of at least one antenna element or the second set of at least one antenna element,
a first angle of arrival (AoA) to the external object from the camera, and
a second AoA to the external object from the first set of at least one antenna element or the second set of at least one antenna element.

17. The method of claim 13, wherein determining the distance from the external object comprises:
determining whether a coverage of each of beams formable by the plurality of second antenna elements is smaller than the FoV of the camera; and
in accordance with a determination that the coverage is smaller than the FoV of the camera, determining the distance from the external object within the FoV of the camera using the beams and a beam formed by the first antenna element.

18. The method of claim 13,
wherein the FoV of the camera comprises a first FoV for a horizontal component and a second FoV for a vertical component, and
wherein the array antenna is determined based on the first FoV and the second FoV.

19. The method of claim 13, further comprising:
determining whether the camera operates or another camera of the electronic device operates; and
in accordance with a determination that the another camera operates, determining the distance from the external object within a FoV of the another camera by using the first antenna element and a third set of at least one antenna element of the plurality of second antenna elements based on the FoV of the another camera.

20. The method of claim 13,
wherein the FoV of the camera has the first value in accordance with a first magnification of the camera, and wherein the FoV of the camera has the second value in accordance with a second magnification of the camera different from the first magnification of the camera.

\* \* \* \* \*